(12) United States Patent
Farmer et al.

(10) Patent No.: US 9,036,257 B2
(45) Date of Patent: May 19, 2015

(54) PORTABLE MOVIE SCREENS, SYSTEMS, AND METHODS OF USING THE SAME

(71) Applicant: Open Air Cinema LLC, Lindon, UT (US)

(72) Inventors: Stuart C. Farmer, Orem, UT (US); Marcus J. Clawson, Orem, UT (US)

(73) Assignee: Open Air Cinema LLC, Lindon, UT (US)

( * ) Notice: Subject to any disclaimer, the term of this patent is extended or adjusted under 35 U.S.C. 154(b) by 0 days.

(21) Appl. No.: 14/289,846

(22) Filed: May 29, 2014

(65) Prior Publication Data

US 2014/0355110 A1     Dec. 4, 2014

Related U.S. Application Data

(60) Provisional application No. 61/829,870, filed on May 31, 2013.

(51) Int. Cl.
    *G03B 21/58*     (2014.01)
    *G03B 21/585*     (2014.01)

(52) U.S. Cl.
    CPC ............. *G03B 21/58* (2013.01); *G03B 21/585* (2013.01)

(58) Field of Classification Search
    CPC .............................. G03B 21/585; G03B 21/58
    USPC .............................. 359/443, 461, 736; 40/610
    See application file for complete search history.

(56) References Cited

U.S. PATENT DOCUMENTS

| | | |
|---|---|---|
| D219,408 S | 12/1970 | Frish |
| 3,720,455 A | 3/1973 | Sahlin |
| 4,022,522 A | 5/1977 | Rain |
| 4,258,821 A | 3/1981 | Wendt |
| 4,323,301 A | 4/1982 | Spector |
| 4,369,591 A | 1/1983 | Vicino |
| 4,802,734 A | 2/1989 | Walter |
| 5,116,273 A | 5/1992 | Chan |
| 5,274,200 A | 12/1993 | Das |
| 5,553,908 A | 9/1996 | Shink |
| 5,567,127 A | 10/1996 | Wentz |

(Continued)

FOREIGN PATENT DOCUMENTS

WO     WO 2008065400     6/2008

OTHER PUBLICATIONS

U.S. Appl. No. 61/927,882, filed Jan. 15, 2014, Farmer.

(Continued)

*Primary Examiner* — Christ Mahoney
(74) *Attorney, Agent, or Firm* — Workman Nydegger

(57) ABSTRACT

A portable movie screen includes a screen portion and a frame portion surrounding at least part of the periphery of the screen portion. The screen portion has a screen gain greater than about 0.8 and an elasticity greater than an elasticity of the frame portion. The movie screen includes at least one side connected to the front portion and a receiving space defined at least in part by the front portion and the side portion. The receiving space is configured to selectively receive a support body including at least one sealed chamber and movable between a collapsed configuration and an expanded configuration. The frame portion is configured such that when the support body is in the expanded configuration and positioned in the receiving space, the frame portion tensions the screen portion and substantially maintains the screen portion in a desired shape.

20 Claims, 28 Drawing Sheets

(56) References Cited

U.S. PATENT DOCUMENTS

| | | |
|---|---|---|
| 5,672,052 A | 9/1997 | Ishida |
| 5,929,394 A | 7/1999 | Westerbeke |
| 6,008,938 A | 12/1999 | Suehle |
| 6,039,547 A | 3/2000 | Hendrix |
| 6,145,616 A | 11/2000 | Ewanek |
| 6,447,264 B1 | 9/2002 | Lucas et al. |
| 6,668,475 B2 | 12/2003 | Carolan |
| 6,739,725 B2 | 5/2004 | Ben-Ari |
| 6,874,263 B2 | 4/2005 | Ohmuku |
| 7,006,154 B2 | 2/2006 | Dudkowski |
| 7,181,877 B2 | 2/2007 | Quade |
| 7,316,257 B2 | 1/2008 | Cameron |
| 7,397,603 B2 | 7/2008 | Peterson |
| 7,446,937 B2 | 11/2008 | Poretskin |
| 7,490,426 B2 | 2/2009 | Scarberry |
| 7,490,697 B1 | 2/2009 | Williamson |
| D593,591 S | 6/2009 | Hochendoner |
| D608,406 S * | 1/2010 | Cobb et al. .................... D21/835 |
| 7,716,876 B2 * | 5/2010 | Wiegand et al. ............... 52/2.11 |
| 7,874,400 B2 | 1/2011 | Teisseyre |
| 7,878,772 B2 | 2/2011 | Rexhauser et al. |
| 7,920,326 B2 * | 4/2011 | Clawson et al. ............... 359/443 |
| 7,942,533 B2 * | 5/2011 | Ganzevoort ..................... 353/79 |
| 7,961,388 B1 | 6/2011 | Deutsch |
| 8,042,292 B2 | 10/2011 | Gibb |
| 8,045,264 B2 | 10/2011 | Elliot |
| 8,047,257 B2 | 11/2011 | McIntosh |
| D654,945 S | 2/2012 | Giammarinaro |
| 8,243,366 B1 * | 8/2012 | Deutsch ........................ 359/449 |
| 8,254,024 B2 * | 8/2012 | Giammarinaro, Jr. ........ 359/450 |
| 8,511,365 B2 | 8/2013 | McIntosh |
| 8,763,291 B1 * | 7/2014 | Nichols ........................... 40/603 |
| 8,769,881 B2 * | 7/2014 | O'Farrill Haro ............... 52/2.18 |
| 2003/0014757 A1 | 1/2003 | Craven |
| 2004/0123782 A1 | 7/2004 | Korber |
| 2005/0083486 A1 | 4/2005 | Johnson |
| 2005/0083651 A1 | 4/2005 | Smith |
| 2005/0135068 A1 | 6/2005 | Huff |
| 2005/0202714 A1 | 9/2005 | Strayer |
| 2006/0169607 A1 | 8/2006 | Carnevali |
| 2006/0285816 A1 | 12/2006 | Pokorny et al. |
| 2007/0086088 A1 | 4/2007 | Astill |
| 2009/0242148 A1 | 10/2009 | Zheng |
| 2009/0298385 A1 | 12/2009 | Brinckerhoff |
| 2010/0008798 A1 | 1/2010 | Clawson |
| 2010/0194982 A1 | 8/2010 | Farmer |

OTHER PUBLICATIONS

U.S. Appl. No. 12/205,465, Jun. 23, 2010, Office Action.
U.S. Appl. No. 12/697,811, Mar. 7, 2012, Office Action.
U.S. Appl. No. 12/205,493, May 20, 2011, Office Action.
U.S. Appl. No. 12/205,493, Oct. 25, 2011, Office Action.
U.S. Appl. No. 12/205,465, Dec. 9, 2010, Notice of Allowance.
U.S. Appl. No. 12/205,493, Mar. 28, 2012, Office Action.
U.S. Appl. No. 12/697,811, Aug. 7, 2012, Office Action.
U.S. Appl. No. 12/697,811, Apr. 25, 2013, Office Action.
U.S. Appl. No. 12/205,493, May 9, 2013, Office Action.
U.S. Appl. No. 12/205,493, Nov. 4, 2013, Final Office Action.
U.S. Appl. No. 12/697,811, Dec. 18, 2013, Final Office Action.
U.S. Appl. No. 12/205,493, Jun. 24, 2014, Office Action.
U.S. Appl. No. 12/697,811, Oct. 10, 2014, Office Action.
U.S. Appl. No. 12/205,493, Sep. 14, 2012, Final Office Action.

* cited by examiner

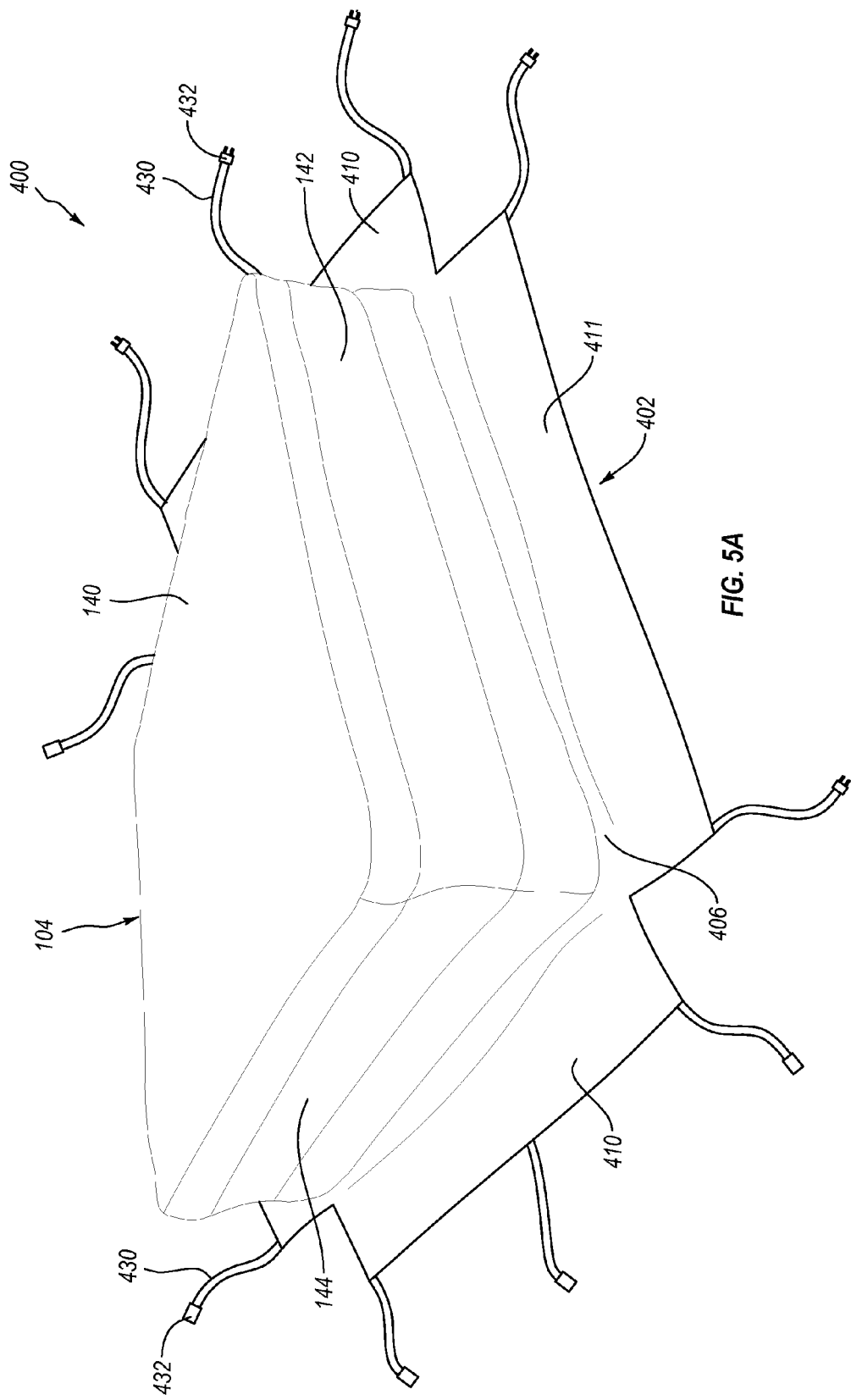

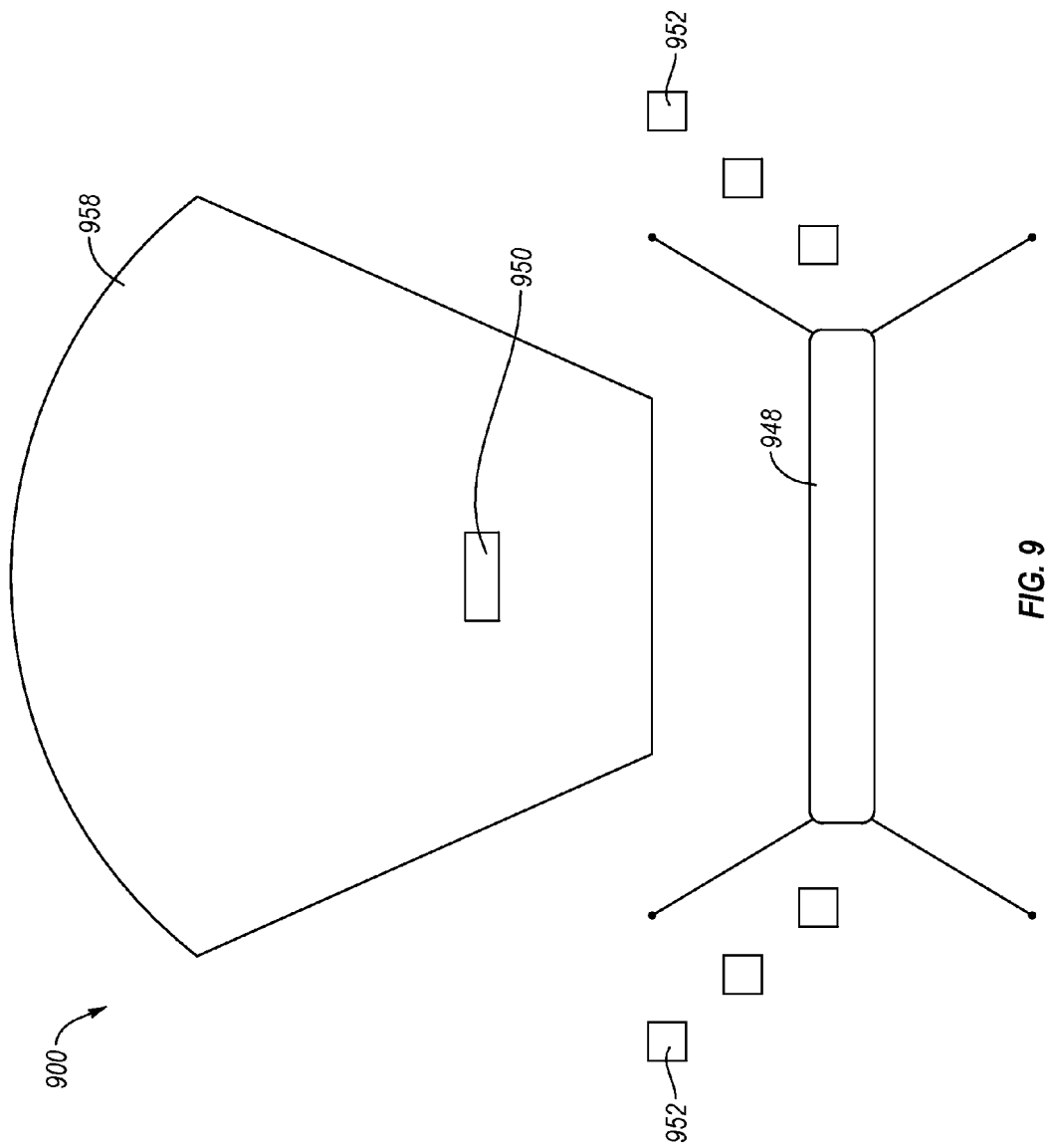

PORTABLE MOVIE SCREENS, SYSTEMS, AND METHODS OF USING THE SAME

CROSS-REFERENCE TO RELATED APPLICATIONS

This application claims the benefit of, and priority to, U.S. Provisional Patent Application Ser. No. 61/829,870, entitled "INFLATABLE MOVIE SCREEN COVERS, SYSTEMS, AND METHODS OF USING THE SAME," and filed on May 31, 2013, which is hereby incorporated herein in its entirety by this reference.

BACKGROUND

Portable movie screen technology is revitalizing the movie industry and allowing large numbers of people to view movies in many different forums and venues. One conventional type of portable movie system includes an inflatable support structure with a projection screen and an air blower that pushes air into the inflatable support structure. To keep the support structure inflated, the air blower must constantly, or almost constantly, push air into the inflatable support structure.

Unfortunately, conventional portable movie systems such as these tend to suffer from a number of drawbacks. For example, the air blower can be noisy, potentially disrupting a movie or other presentation. In particular, if a viewer is positioned near the screen and/or air blower, the noise from the blower may drown out the sound from the movie or presentation and/or at the least be a significant nuisance. Additionally, access to an appropriate power source for the air blower can significantly restrict the number of locations where the system can be set up. Another drawback is that because such large air flow volumes are required to keep the support structure inflated, the support structure is typically constructed from heavy materials, making such systems expensive, difficult to set up, and cumbersome.

Some portable movie systems have attempted to use an internal or external support frame instead of the inflatable support structure to support the projection screen. However, the projection screen's surface commonly deforms or has edges or sides that bend or bow, thereby distorting or interrupting images projected thereon. Moreover, such screens tend to have inferior image quality.

In view of the shortcomings of conventional inflatable movie screens, there exists a substantial need for an outdoor movie screen system that is quiet, lightweight, easy to set up, and versatile.

SUMMARY

A portable movie screen is disclosed for displaying a movie or other presentation to an audience in almost any location. The portable movie screen is configured to operate without continuous air flow from an air blower and includes a front portion having a screen portion and a frame portion surrounding at least part of the periphery of the screen portion. The screen portion has a screen gain greater than about 0.8 and an elasticity greater than an elasticity of the frame portion. The movie screen includes at least one side connected to the front portion and a receiving space defined at least in part by the front portion and the side portion. The receiving space is configured to selectively receive a support body including at least one sealed chamber and movable between a collapsed configuration and an expanded configuration. The frame portion is configured such that when the support body is in the expanded configuration and positioned in the receiving space, the frame portion tensions the screen portion and substantially maintains the screen portion in a desired shape.

Features from the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the disclosure, wherein identical reference numerals refer to identical or similar elements or features in different views or embodiments shown in the drawings.

FIGS. 5A-5C illustrate a plurality of steps for assembling a movie screen according to an embodiment;

FIG. 9 is a top view of a movie display system according to an embodiment.

DETAILED DESCRIPTION

Figure 1A:
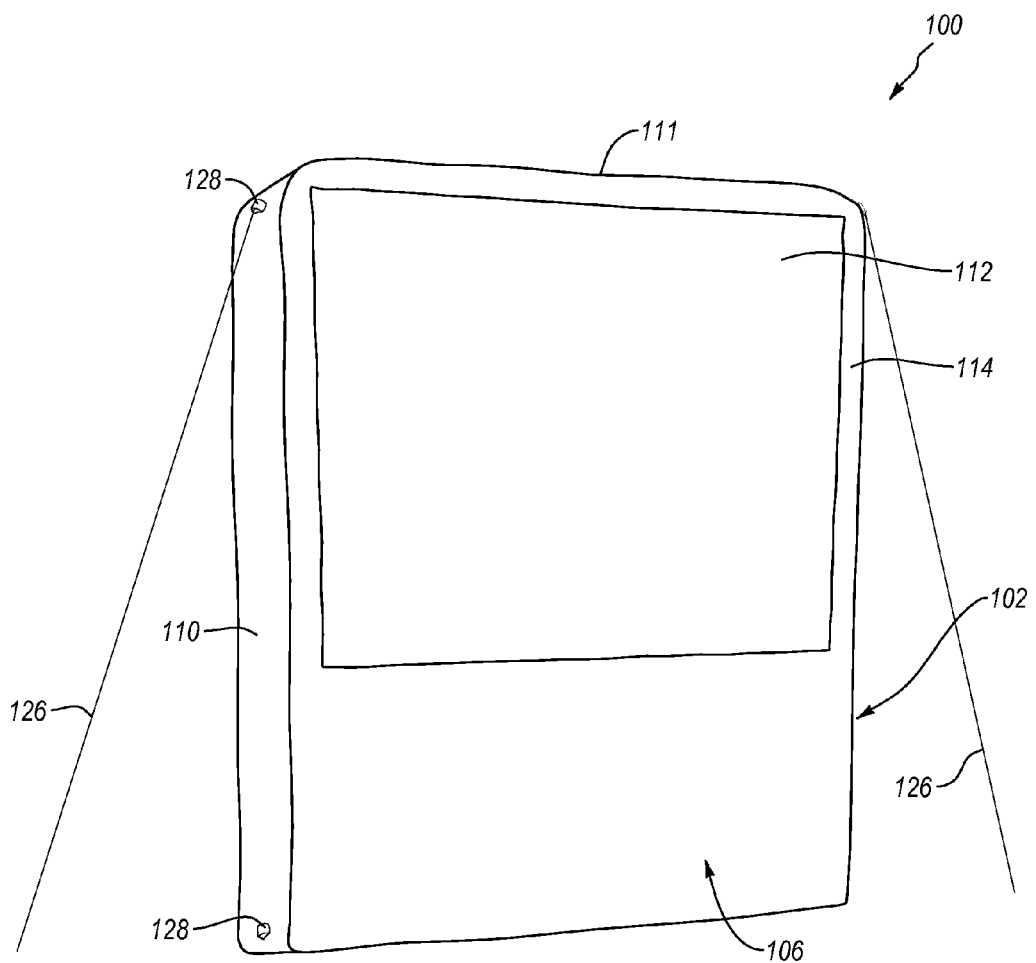
FIG. 1A is a front isometric view of a portable movie screen system according to an embodiment.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no invention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this patent to possess a described meaning, there is no intent to limit the meaning of such term, either expressly or indirectly, beyond its plain or ordinary meaning.

Any element in a claim that does not explicitly state "means for", performing a specified function, or "step for", performing a specific function, is not to be interpreted as a "means" or "step" clause as specified in 35 U.S.C. §112, paragraph 6.

While embodiments of the present disclosure are generally described in connection with outdoor environments, it will be appreciated that the embodiments can be applied indoors and/or in any other suitable environment.

Embodiments of the present disclosure relate to portable movie screens and systems that are lightweight, easy to use, and do not require continuous air from noisy air blowers. Moreover, embodiments of the present disclosure can provide a user or a user's audience with the freedom to view movies or other presentations almost anywhere, such as while camping, at the lake, on a playing field, in a garage, or other suitable locations.

FIGS. 1A-1E illustrate a portable movie screen system 100 according to an embodiment. The portable movie screen system 100 can include a portable movie screen or cover member 102 and a support body 104 (shown in FIG. 1D).

As discussed in more detail below, the support body 104 can be selectively positioned in a receiving space 118 of the cover member 102 and moved to an expanded configuration or inflated. The cover member 102 is sized and configured such that the expansion of the support body 104 in the receiving space 118 causes the cover member 102 to stretch and/or tighten over the support body 104. The tightness of the cover member 102 and the air pressure within the support body 104 can provide overall support and rigidity to the cover member 102.

When the support body 104 is expanded in the receiving space 118, the pressure exerted on the cover member 102 by the support body 104 can also tighten a screen portion 112 of the cover member 102. The cover member 102 can be sized and configured such that when the support body 104 is in the expanded configuration within the receiving space 118, it can cause the cover member 102 to automatically and/or selectively provide tension to the screen portion 112. This has the effect of reducing wrinkles on the screen portion 112 and/or flattening out the screen portion 112, substantially improving image quality. The support body 104 and/or the cover member 102 may include one or more features configured to control or direct the pressure exerted on the cover member 102 by the support body 104.

Figure 1B:
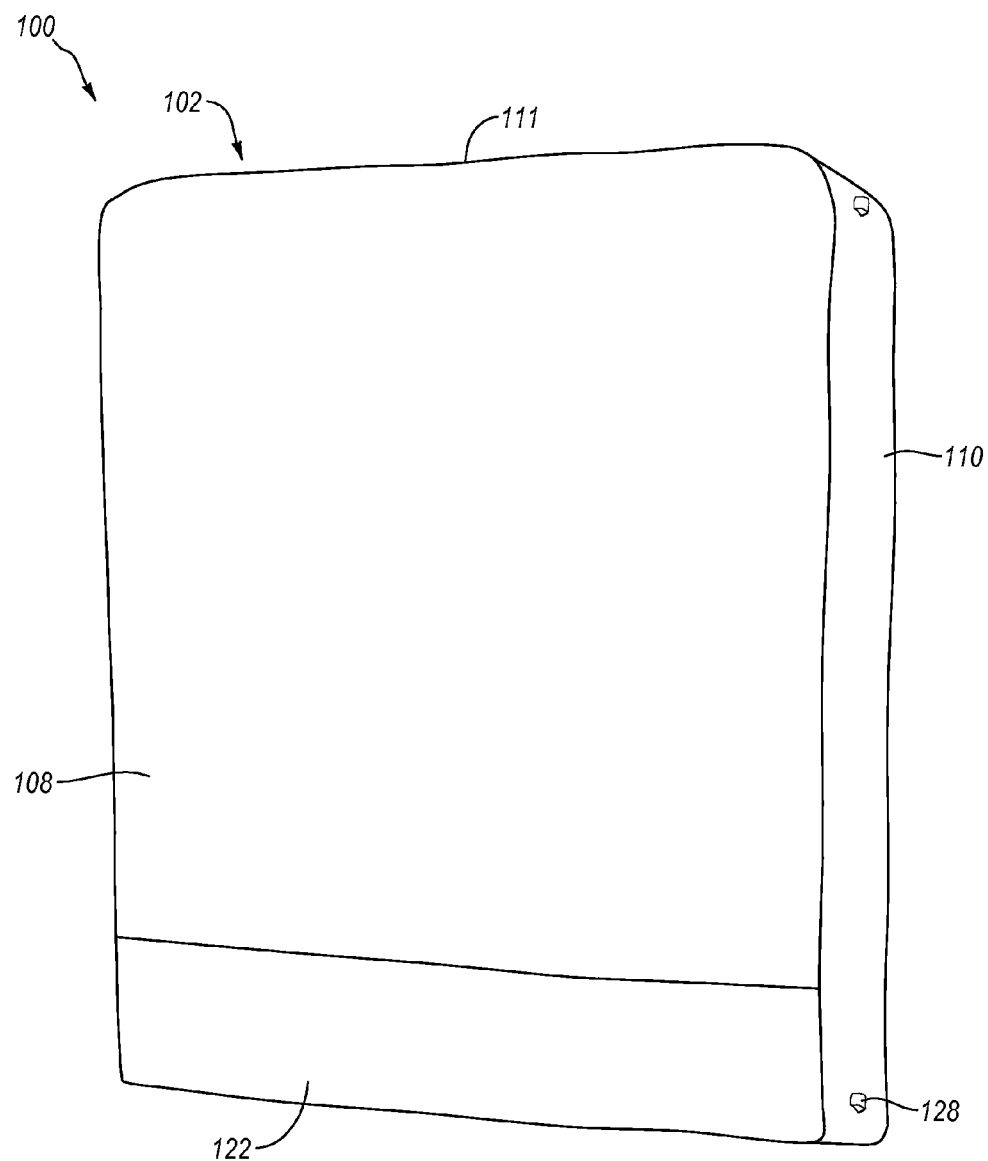
FIG. 1B is a back view of the movie screen shown in FIG. 1A.

Referring to FIGS. 1A and 1B, the cover member 102 may include a front portion 106, a back portion 108 generally opposite the front portion 106, opposing side portions 110 extending between the front portion 106 and the back portion 108, and an upper end portion 111 extending between the front portion 106 and the back portion 108.

The side portions 110 and the upper end portion 111 may be connected to the front portion 106 in any suitable manner. For example, an edge of the side portions 110 and/or the upper end portion 111 may be connected to an edge portion of the front portion 106 via stitching thereby forming one or more seams between the front portion 106 and the side portions 110 and/or the upper end portion 111. The side portions 110 and/or the upper end portion 111 may be connected to the edge portion of the front portion 106 via adhesives, mechanical fasteners, clips, snaps, buttons, combinations thereof, or any other suitable type of connection.

Similar to the front portion 106, the back portion 108 may be connected to the side portions 110 and/or the upper end portion 111 in any suitable manner. The side portions 110 and the upper end portion 111 may comprise a single member extending between the front portion 106 and the back portion 108. In other embodiments, the side portions 110 and the upper end portion 111 may comprise two, three, four, or any other suitable number of members extending between the front portion 106 and the bottom portion 108. The side portions 110 and the upper end portion 111 may be integral to the front portion 106 and/or the back portion 108.

Alternatively, the side portions 110 and the upper end portion 111 may be omitted. For example, in an embodiment, the front portion 106 may be directly connected to the back portion 108 to define the receiving space 118.

The front portion 106 can include the screen portion 112 and a frame portion 114. The screen portion 112 is configured as a projection or other type of viewing surface. The screen portion 112 may be configured for indoor and/or outdoor viewing. The screen portion 112 may have a generally rectangular shape. It should be appreciated that a rectangle should not be given any specific proportions and can include any sized rectangle, including a square with sides of generally equal lengths. The screen portion 112 may have a generally oval, oblong, elliptical, trapezoidal, or any other appropriate shape. The screen portion 112 may include rounded corners. The screen portion 112 may be integral to the front portion 106. The screen portion 112 may be fixedly attached to the front portion 106. For instance, the screen portion 112 may comprise a piece of material or a coating sewn or glued to the front portion 106. In yet other embodiments, the screen portion 112 can be positioned over an opening through the frame portion 114.

Optionally, the screen portion 112 may be removably attached to the front portion 106. The screen portion 112 may be removably attached to the front portion 106 via a hook-and-loop type system (e.g., VELCRO). A first portion of the hook-and-loop system may be attached to the screen portion 112, while a mating second portion of the hook-and-loop type system is attached to the front portion 106.

By connecting the first and second portions of the hook-and-loop type system around the perimeter of the screen portion 112, the screen portion 112 can be removably attached to the front portion. The screen portion 112 may be removably attached to the front portion 106 via a zipper system or any other suitable attachment system. Such an arrangement can allow the screen portion 112 to be easily removed as desired. For example, as the portable movie screen system 100 is used outdoors, the screen portion 112 can get wet or dirty. Thus, a user can remove the screen portion 112 to wash it or to store it separately to avoid buildup of mildew. Moreover, in an indoor environment, the screen portion 112 can be removed from the front portion 106 and stored separately to help keep it from being wrinkled with the cover member 102.

The screen portion 112 may be generally white, light grey, green, or any other suitable color. For example, the screen portion 112 may comprise a substantially black piece of material with a heavy white pigment coating on the front face to act as the projection surface side. The back side of the black material can function to serve as a light block from ambient light. In addition, the back side of the black material can provide a shield to prevent projected image light from leaking through the screen portion 112 from leaking through and being "wasted." Further, such a configuration can provide a shield from dirt and stains from the ground or walls.

The screen portion 112 can comprise a substantially white material with a heavy black pigment coating on one side. The white side of the screen portion 112 being the projection surface and the black side being the back and configured to block ambient light and shield the projection surface. The screen portion 110 can comprise an all-white, off white (e.g., bone colored), or grey material with rear projection capability.

The screen portion 112 may include a screen gain configured to enhance perceived brightness of a projected image on the screen portion 112. Screen gain or gain is a measurement of the reflectivity of a screen or projection surface. The gain represents a ratio of the light that is reflected from a screen as compared to the light reflected from a standard white (magnesium oxide) board. Therefore a screen with a gain of 1.0 reflects the same amount of light as that from a standard white (magnesium oxide) board. The gain of a conventional white bed sheet is normally less than about 0.7 (e.g., about 0.5). Gain is measured from the vantage point where the screen is at its brightest, which is typically directly in front and perpendicular to the screen. If a viewer moves to the side and views the screen at an angle the brightness of the projected image typically drops.

In an embodiment, the screen portion 112 may have a gain greater than 0.8. In other embodiments, the screen portion 112 may have a gain between about 0.8 and about 3; between about 1 and about 2.8; between about 1.2 and about 2.5; between about 1 and about 2; or between about 1 and 1.3. In yet other embodiments, the screen portion 112 may have a higher or lower gain. This has the effect of increasing the perceived brightness of a projected image on the screen portion 112. Alternatively, the screen portion 112 may have a low gain (e.g., 0.8 to 1.3) that diffuses light more evenly over a wider angle of view. In other embodiments, the screen portion 112 may have a high gain (e.g., greater than 1.3) with a narrower usable viewing angle.

The cover member 102 may be offered for sale with a plurality of different screen portions 112, each exhibiting a different gain, weight, fabric, or the like. Accordingly, a user or viewer may have the ability to customize the cover member 102 as desired. In yet other embodiments, the cover member 102 may include screen portions 112 configured for use in different weather conditions. For example, in an embodiment, the cover member 102 may include a winter screen portion 112 for use in the winter and a rain screen portion 112 for use in the rain. Thus, a user or viewer can attach one screen portion 112 or another to the front portion 106 depending on the weather conditions. In other embodiments, if the screen portion 112 is damaged, the user may simply replace the screen portion 112 without having to purchase a whole new cover member 102.

The screen portion 112 may be reversible. The screen portion 112 may include a first projection surface on a first side having an aspect ratio of 4:3 and a second projection surface on a second side having an aspect ratio of 16:9. A viewer can customize the screen portion 112 based on the viewer's viewing preferences. In another embodiment, the first side of the screen portion 112 may include a projection surface and the second side can include a backing protective material.

When the screen portion 112 is not in use, the viewer can attach the screen portion 112 to the front portion 106 such that the projection surface is protected between the backing protective material and the front portion 106. When the viewer desires to view a movie or other presentation on the screen portion 112, the viewer can reverse the screen portion 112 such that the projection surface is facing away from the front portion 106. This allows the viewing surface to be easily used and/or protected from water, dirt, and debris.

The screen portion 112 may include any suitable material. For example, the screen portion 112 may be made of a Poly (vinyl chloride) ("PVC") or nylon material. Lightweight nylon may, for example, provide wrinkle resistance, and be used for its ability to minimize wrinkles, even despite storage of the screen portion 112 by compressing or folding it into a duffle bag or a box. The screen portion 112 may be formed of a polyester material, such as spandex. Such a material may, for example, facilitate stretching when tension is applied by the inflatable support structure as described below in more detail.

The screen portion 112 may be manufactured from a single piece of material, and substantially without seams, except for a seam where the screen portion 112 may be sewn to the front portion 106 or otherwise connected thereto. The screen portion 112 may be a single piece of fabric that is not inflatable, is light in color (e.g., white) and may be sewn directly to the front portion 106. Furthermore, because the screen portion 112 can be made of nylon, PVC, or other cleanable materials, it can easily be washed.

Figure 1C:
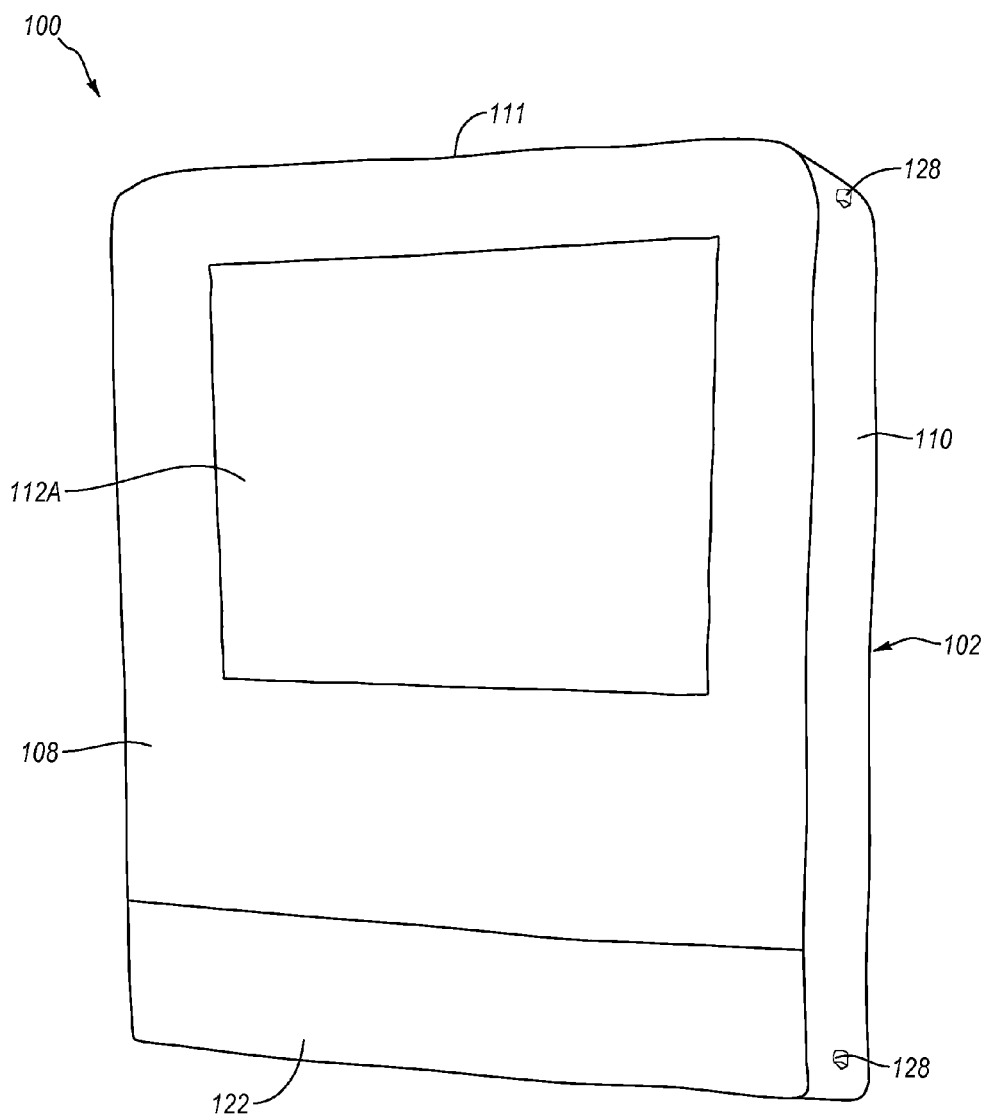
FIG. 1C is a back view of the movie screen shown in FIG. 1A according to another embodiment.

The screen portion 112 can be stamped or printed on the front portion 106. While system 100 is illustrated including a single screen portion 112, in other embodiments it will be appreciated that the system 100 may include a plurality of screen portions. For example, as shown in FIG. 1C, in an embodiment, the back portion 108 may include a second screen portion 112A.

To facilitate stretching the screen portion 112 to a desired size, materials used for the screen portion 112 may be pre-measured, pre-stretched, and the like. When such materials are, for example, pre-stretched to a predetermined size, and then sewn to the front portion 106, and when tension is applied by the support body 104, the screen portion 112 can stretch the amount desired and to the desired shape.

The tension and the shape of the screen portion 112 can thus be predetermined and pre-engineered to provide a specific appearance. For example, it may be desired to have the screen portion 112 have a substantially straight lower edge when the support body 104 is in the expanded configuration (shown in FIG. 1E). To provide such an appearance, the screen portion 112 may therefore have a curved edge so that when the tension is applied to the screen portion 112, the tension pulls the curved edge straight. Other examples of suitable features for tensioning the screen portion 112 are described in U.S. Pat. No. 7,920,326, filed on Sep. 5, 2008, the disclosure of which is incorporated herein, in its entirety, by this reference.

The screen portion 112 may include one or more reflective materials such as, but not limited to, micro-reflective beads, silica, metallic materials (e.g., silver), reflective nylon, reflective paint, magnesium carbonate, titanium dioxide, or any other suitable reflective materials. The screen portion 112 can include one or more layers of reflective paint or reflective coating applied to the front portion 106 of the cover member 102. As an image is projected onto the screen portion 112, the reflective materials of the screen portion 112 can reflect the image's light toward the viewer such that the brightness of the projected image appears to increase.

Referring still to FIG. 1A, the frame portion 114 may extend around the periphery of the screen portion 112. The frame portion 114 may include one or more non-reflective or light absorbing materials configured to absorb light that may otherwise distort or degrade a projected image on the screen portion 112.

The frame portion 114 may be black and the screen portion 112 may be white. Such a configuration provides a high contrast ratio between the screen portion 112 and the frame portion 114, which, in turn, makes a projected image on the screen portion 112 appear brighter.

Similar to the screen portion, the frame portion 114 may include any suitable material. The frame portion 114 can include one or more materials configured to protect the support body 104. For example, the frame portion 114 can include heavy-duty nylon, canvas, a rip-stop material, or other suitable material. In another embodiment, the frame portion 114 may include a lightweight material configured to improve the portability of the cover member 102.

Referring now to FIG. 1B, the back portion 108 may be generally opposite the front portion 106 and the side portions 110 and an upper end portion 111 may extend between the front portion 106 and the back portion 108.

The back portion 108, the side portions 110, and the upper end portion 111 may include a substantially uniform black surface that contrasts the screen portion 112. The darkness of the back portion 108, the side surfaces 110, and the upper end portion 111 may absorb light and may make the screen portion 112 appear brighter to a viewer. The back portion 108, the side portions 110, the upper end portion 111 and/or the front portion 106 may be configured to protect the support body 104. For example, the back portion 108, the side portions 110, the upper end portion 111 and/or the front portion 106 may be generally solid portions of the cover member 102 and may be made of a PVC or nylon material.

Optionally, the back portion 108, the side portions 110, the upper end portion 111, and/or the front portion 106 can have a coating (e.g., urethane). One feature of such materials is that they are lightweight as well as durable. With such materials, the cover member 102 can have its weight reduced to allow the system 100 to be more easily transported and set up. For example, in an embodiment the system 100 may weigh less than about 150 pounds, less than about 75 pounds, less than about 50 pounds, less than about 30 pounds, or less than about 20 pounds. In other embodiments, the system 100 may weigh more or less.

The back portion 108, the side portions 110, the upper end portion 111, and/or the front portion 106 may include an elastic or stretchy material such as a polyester material or spandex. This can facilitate tightening and/or stretching of the cover member 102. The cover member 102 may include one or more stretchy materials such that the cover member 102 can fit sealed inflatable bodies of one or more different sizes.

The back portion 108, the side portions 110, the upper end portion 111, and/or the front portion 106 may not be solid portions of the cover member 102. For example, in an embodiment, the back portion 108 may comprise netting, webbing or strap members extending between the side portions 110. In another embodiment, the side portions 110 may include webbing or elongated members extending between the front portion 106 and the back portion 108.

Figure 1D:
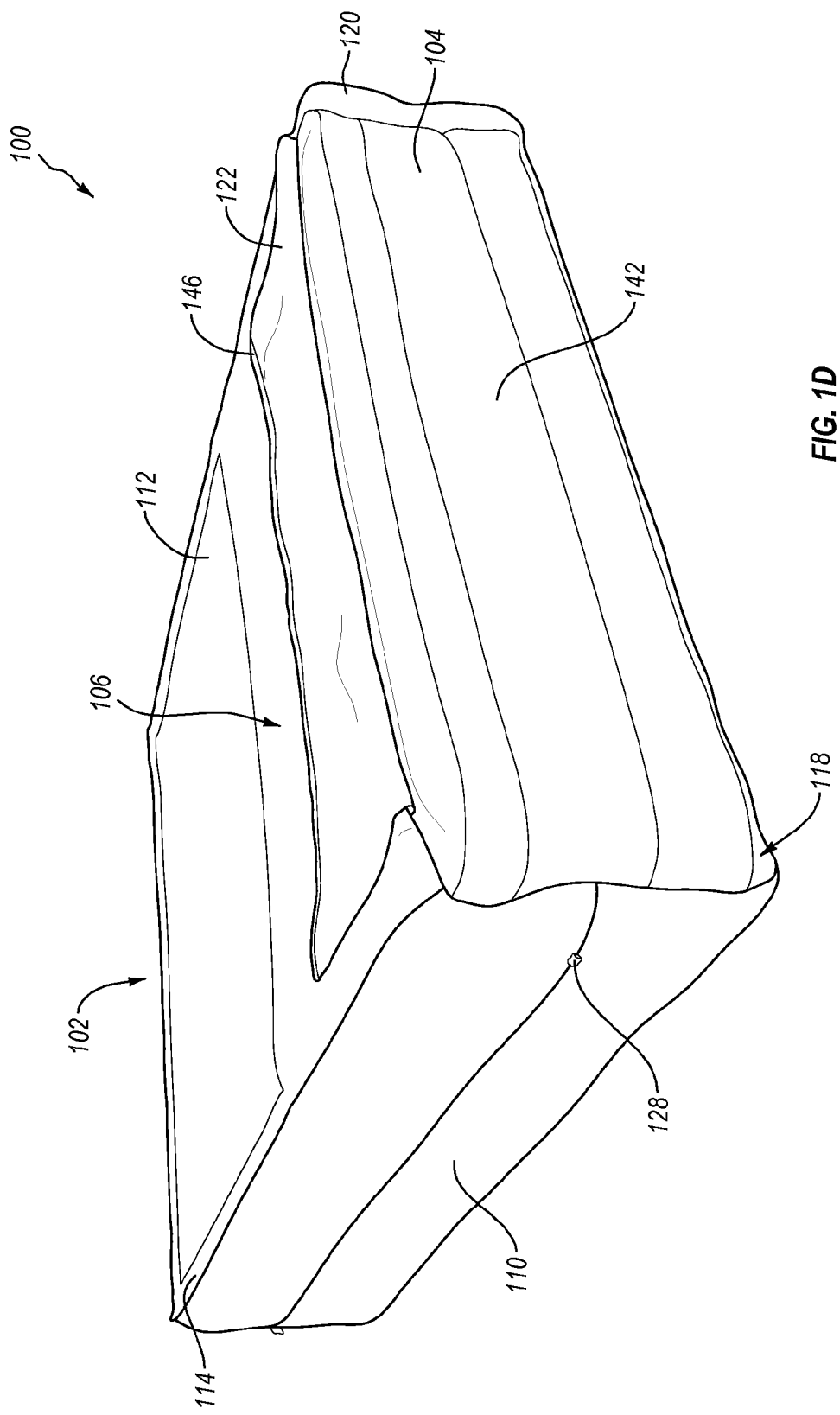
FIG. 1D is a bottom isometric view of the system shown in FIG. 1A.
Figure 1E:
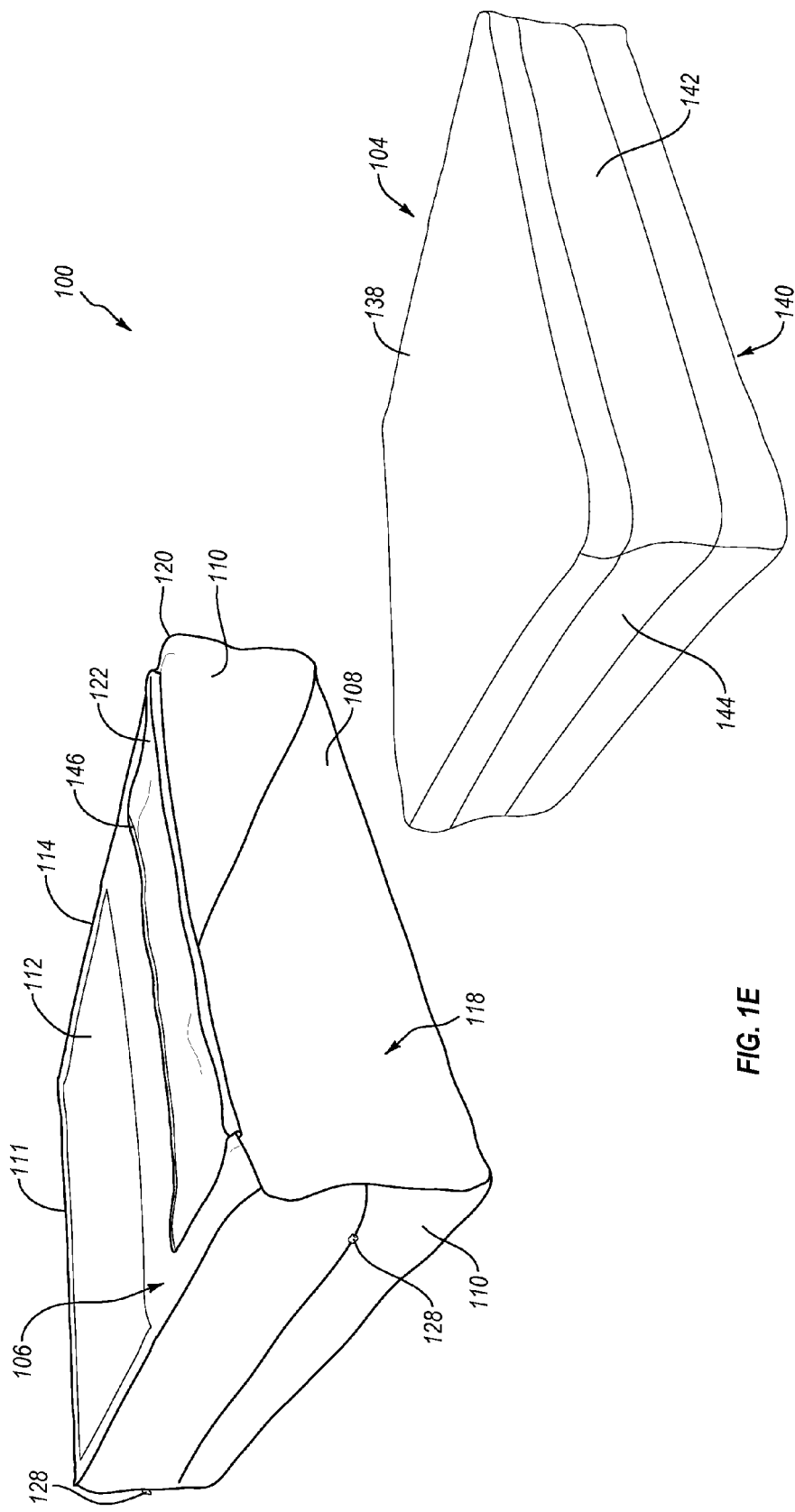
FIG. 1E is an exploded view of the system shown in FIG. 1A.

Referring now to FIGS. 1D and 1E, together, the front portion 106, the back portion 108, the side portions 110, and the upper end portion 111 at least in part define the receiving space 118 within the cover member 102. The receiving space 118 may be sized and/or shaped to be slightly smaller than the size of the support body 104. The receiving space 118 may be sized and/or shaped to generally correspond to the size and/or shape of the support body 104. The receiving space 118 can vary in size and/or shape. The cover member 102 may include one or more elastic or stretchy materials that allow the receiving space 118 to change its size and/or shape in response to pressure exerted on the cover member 102 by the support body 104.

An opening 120 may be formed in a lower end portion of the cover member 102. The opening 120 may be defined by an inner surface of the front portion 106, an inner surface of the back portion 108, and the inner surfaces of the side portions 110. The opening 120 may be configured to access the receiving space 118. The cover member 102 may also include one or more closure elements configured to selectively close and open the opening 120.

Optionally, the one or more closure elements can comprise a flap member 122 pivotally attached to the front portion 106. The flap member 122 may be pivotally attached to the front portion 106 in any suitable manner. An edge portion of the flap member 122 may be attached to a lower edge portion of the front portion 106 via stitching forming one or more seams between the front portion 106 and the flap member 122. The flap member 122 may be connected to the lower edge portion of the front portion 106 via adhesives, mechanical fasteners, clips, snaps, buttons, combinations thereof, or any other suitable type of connection. The flap member 122 may comprise a single member pivotally attached to the front portion 106. The flap member 122 may comprise two, three, five, or any other suitable number of members pivotally attached to the front portion 106. The flap member 122 may be integral to the front portion 106.

The flap member 122 may be movable between an open position and a closed position. In the open position, a free end portion of the flap member 122 is not attached to the back portion 108. As such, the flap member 122 is freely movable and the support body 104 can be freely inserted and/or removed from the receiving space 118 through the opening 120. In the closed position, the free end portion of the flap member 122 is selectively attached to the back portion 108. As shown, the flap member 122 can extend across the opening 120 and between the front portion 106 and the back portion 108. The flap member 122 in the closed position can function to secure the support body 104 in the receiving space 118. The flap member 122 may be attached to the back portion 108 via an attachment element 146 such as, for example, VELCRO® (a hook-and-loop type closure system), zippers, snaps, buttons, clips, combinations thereof, or any other suitable type of connection.

While the closure element is shown as the flap member 122, other closure elements are possible. For instance, the closure element may comprise magnets, buttons, an elastic band(s) or strip(s), snaps, clasps, latch systems, VELCRO® (a hook-and-loop type closure system), combinations thereof, or any other suitable closure element. In other embodiments, the one or more closure elements may be omitted.

As discussed in more detail below, in addition to selectively closing the opening 120, the flap member 122 may be configured to further tension the screen portion 112 of the front portion 106.

When the support body 104 is positioned within the receiving space 118 and in an expanded configuration, the flap member 122 can be pulled from the front portion 106 to the back portion 108. As the flap member 122 is pulled from the front portion 106 to the back portion 108, the flap member 122 can also be pulled around the end wall 142 of the support body 104, and attached to the back portion 108. In the closed position, the support body 104 pushes radially outward on the flap member 122, which, in turn, pulls on the front portion 106, which, in turn, provides tension to the screen portion 112. Such tensioning of the screen portion 112 can reduce wrinkles in the screen portion 112 that can result when the screen portion 112 is too relaxed or loose. The flap member 122 can include one or more stretchy materials. In other embodiments, the flap member 122 can include one or more non-stretchy materials such as canvas or rubber materials.

The support body 104 may exhibit any number of suitable configurations. For instance, the support body 104 can comprise a sealed support body. A sealed support body is a support structure including at least one sealed chamber. In the illustrated embodiment, the support body 104 includes rectangular front and back walls 138 and 140, end walls 142, and opposing side walls 144, to form an airtight chamber or air bladder. The air bladder can include one or more valve members which permit fluid flow (e.g., air flow) into the air bladder, but prevent fluid flow out of the air bladder. The one or more valve members may also be operable to permit release of fluid from the air bladder. Thus, the support body 104 can be sealed via the one or more valve members 124.

Upon inflation, the support body 104 can maintain air pressure within the air bladder without the need of continuous air flow from an air blower. This advantageously allows a user to use the portable movie screen system 100 without disruptive noises from an air blower or other continuous air technology as in the prior art. The support body 104 may be formed from any suitable material. For example, the support body 104 can be formed of a lightweight and durable material.

Figure 2A:
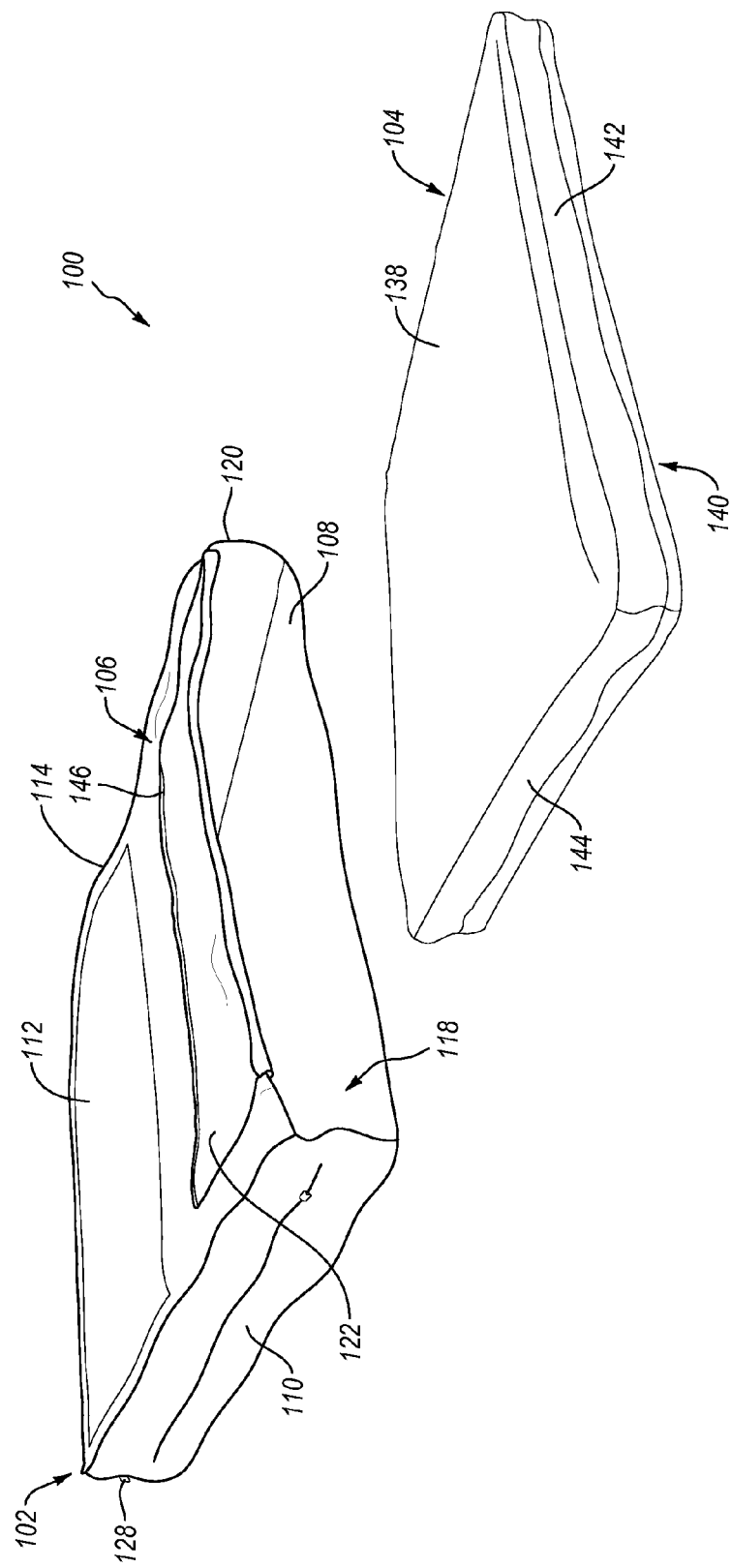
FIGS. 2A-2D illustrate a plurality of steps for assembling a movie screen according to an embodiment.
Figure 2B:
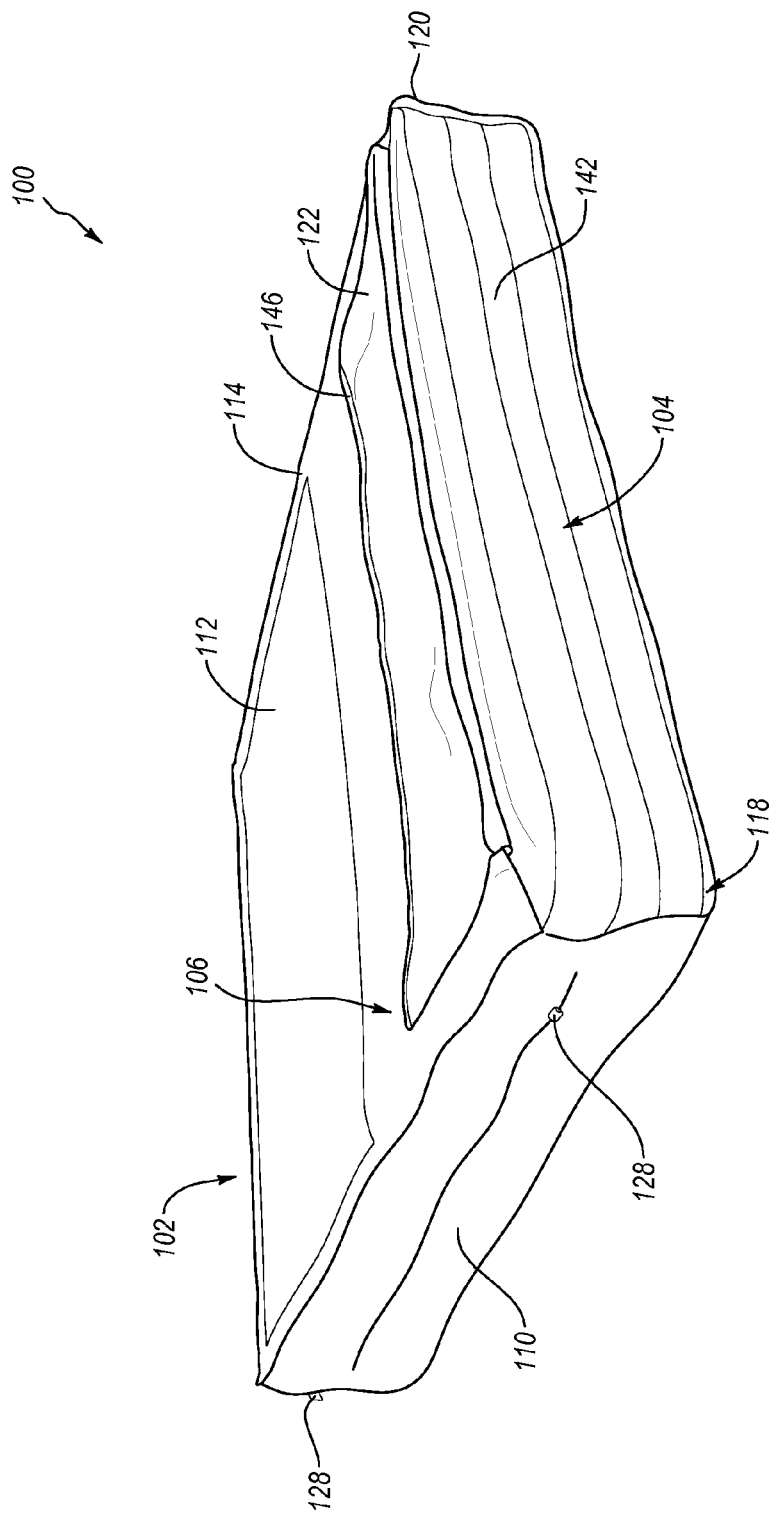
Figure 2C:
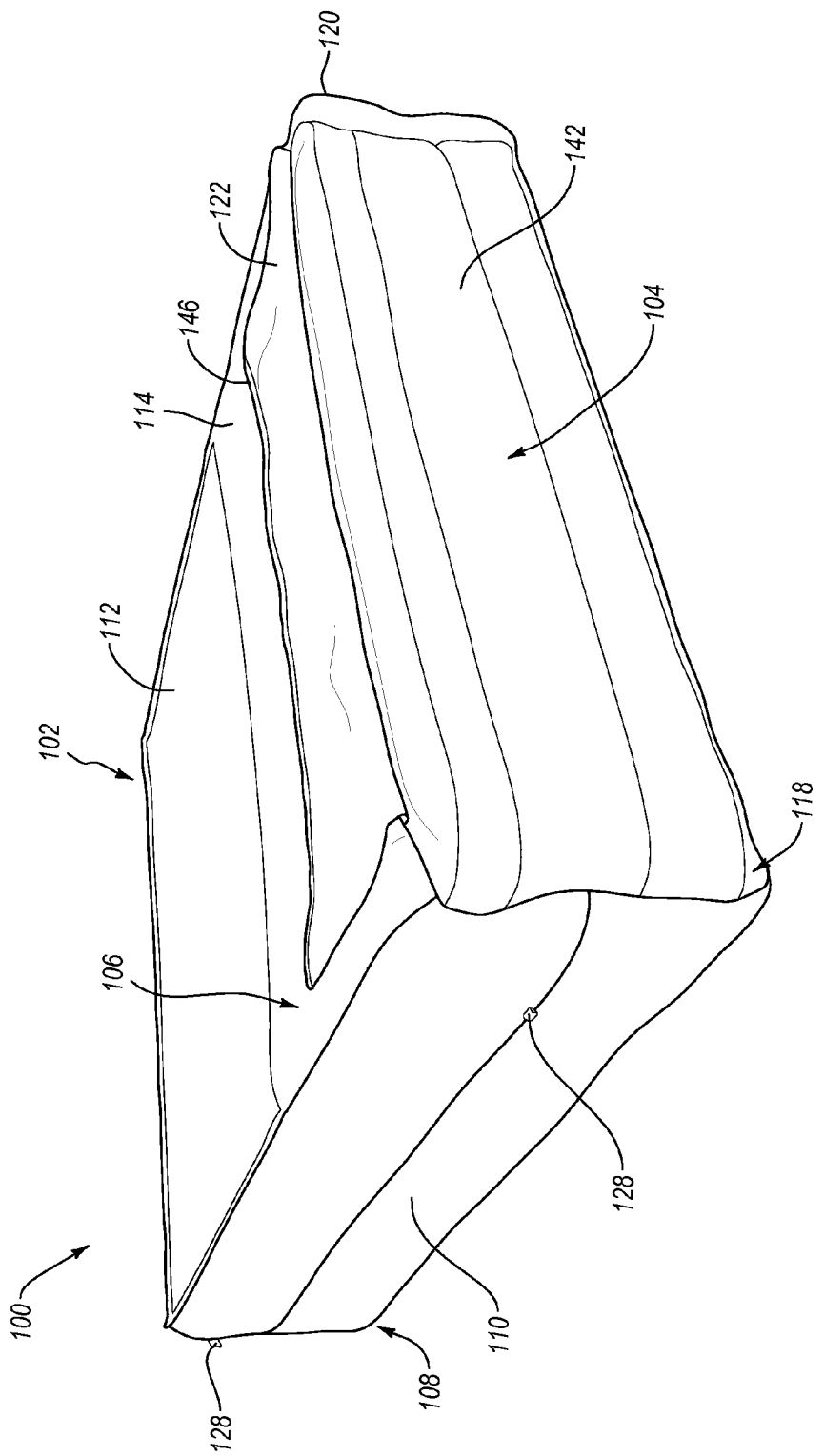

The support body 104 can be configured to move between a collapsed configuration (shown in FIG. 2A) and an expanded configuration (shown in FIG. 2C). In the collapsed configuration, the internal pressure within the support body 104 is less than pressure acting on the outside of the support body 104 (e.g., atmospheric pressure). In the collapsed configuration, the support body 104 may be folded or otherwise stored in a backpack, a case, or bag. This allows the support body 104 to be easily transported and/or stored.

In the expanded configuration, the internal pressure within the support body 104 is sufficiently above the pressure acting on the outside of the support body 104, such that the support body 104 expands to a desired volume and/or shape determined by the materials and support body's construction. The support body 104 in the expanded configuration is sealed via the one or more valve members 124. The internal pressure of the support body 104 in the expanded configuration can provide overall support and rigidity to the support body 104 and the cover member 102.

Optionally, the air bladder may include one or more internal cells, partitions, internal pulling, or baffles. Such a configuration may help maintain a desired shape and/or provide additional structural support to the support body 104. Such a configuration may also help direct and/or control pressure exerted on the cover member 102 by the inflatable body 104. For example, the air bladder may include a plurality of fibers or baffles interconnecting the front and back walls 138, 140 of the support body 104 such that the pressure exerted on the cover member 102 is generally exerted by the end walls 142 and/or the side walls 144.

To move the support body 104 from the collapsed configuration toward expanded configuration, the internal pressure of the air bladder can be increased by forcing fluid (e.g., air) through the one or more valve members 124. To move the support body 104 from the expanded configuration toward the collapsed configuration, internal pressure of the air bladder can be decreased by removing air from the air bladder through the one or more valve members 124.

The support body 104 may be orally inflated and/or deflated by the user through the one or more valve members 124. The support body 104 may be inflated and/or deflated by a manual or electric powered pump that is in fluid communication with the one or more valve members 124. Alternatively, the support body 104 may include an inflation-deflation device (not shown) incorporated therein that is in fluid communication with the one or more valve members 124. The inflation-deflation device can be configured to contract or expand the support body 104 between the expanded configuration and the collapsed configuration.

The support body 104 may be a dedicated support body. The support body 104 may be manufactured specifically to be used with the cover member 102. It will be appreciated that the support body 104 may be sized and configured to exhibit any suitable shape or size. The support body 104 may exhibit a generally right triangular shape. This arrangement may help maintain the system 100 in an upright position. The support body 104 may exhibit a generally rectangular shape.

The support body 104 may have any suitable size. The support body 104 may have a width of about 10.5 ft. and a height of about 5.8 ft. In yet other embodiments, the support body 104 may have a width of about 13.5 ft. and a height of about 7.8 ft. The support body 104 may have a width of about 12 ft. and a height of about 7 ft. In other embodiments, the support body 104 may exhibit greater or smaller widths or heights.

The thickness of the support body 104 may be sized and configured for different uses of the portable movie screen system 100. The support body 104 may be configured to be relatively thinner than the inflatable supports of the prior art. This arrangement allows the system 100 to be easily hung from a support such as, for example, a wall surface or a tree branch. Alternatively, the support body 104 may be configured to be relatively thicker so as to provide additional stability to the portable movie screen system 100 in an upright position.

The support body 104 may be a multi-use support body. For instance, the support body 104 may comprise a commercially available air mattress that can be an inflatable movie screen support and a sleeping mattress. The support body 104 may comprise a twin air mattress, a full size air mattress, a queen air mattress, or a king air mattress. For example, the support body 104 can include, but is not limited to, The Swiss Gear Insta-bed Raised Queen, commercially available from Wenger, Switzerland; The Single High Quickbed Air Bed-Full, available from Coleman of Golden, Colo.; or The Serta 3-in-1 Twin/King-size Combo Airbed with External AC Pump, available from Serta International of Hoffman Estates, Ill., all of which are incorporated herein, in their entirety, by this reference. Of course, other air mattresses may be employed for the support body 104. Such a configuration provides additional value and practicality to users. In yet other embodiments, the support body 104 may comprise a flotation device such as an inflatable raft or a blow-up toy. In yet other embodiment, the support body 104 may be omitted. For example, in an embodiment, the system 100 may include a conventional mattress or box spring as a support for the cover member 102. In other embodiments, the system 100 may include foam mattresses, pillow top mattresses, or any other suitable support member that can move between the expanded configuration and the collapsed configuration.

While the portable movie screen system 100 is illustrated including a single support body, in other embodiments, the portable movie screen system 100 can include any number of sealed inflatable bodies. For example, the portable movie screen system 100 may include two, three, four, or any other number of suitable sealed inflatable bodies. In an embodiment, the three twin size inflatable mattresses may be positioned in the receiving space 118 of the cover member 102. In other embodiments, two full size inflatable mattresses may be positioned in the receiving space 118 of the cover member 102. Accordingly, the size of the portable movie screen system 100 may be customized by varying the number of sealed inflatable bodies in the receiving space 118. In addition, if one or more of the sealed inflatable bodies is punctured or damaged, one or more of the sealed inflatable bodies may be removed for repair or replacement.

Additionally, the portable movie screen system 100 can include any number of supporting elements to facilitate maintenance of the portable movie screen system 100 in a generally upright position. In FIG. 1A, for example, a set of optional tethers 126 are illustrated that connect to rings 128 or other suitable connectors at or near the upper end portion 111 of the cover member 102. Such tethers can then angle down towards the ground, where they can be secured by a stake or other suitable device. For example, such tethers can be secured by weights, water ballasts, or sand bags. Additional or alternative bottom tethers 126 may also be connected to the cover member 102. For example, rings 128 are provided at the bottom of the side portions 110. The bottom tethers 126 may then be extended therefrom and can also be secured in any suitable manner. Instead of tethers 126, stakes or other securement devices (e.g., weights, water ballasts, and sand bags) may also be connected directly to the rings 128 so as to secure the portable movie screen system 100 to a support. As will be appreciated in view of the disclosure herein, the position of the tethers 126 and rings 128 can vary depending on the structure, size, and design of the system 100. Additionally, the tethers 126 can extend in virtually any direction. In other embodiments, sleeve members may extend longitudinally along the side portions 110 of the cover member 102. The sleeve members may be configured to receiving support poles that can be secured to the ground to help maintain the system 100 in an upright position.

FIGS. 2A through 2D illustrate a method of assembling the portable movie screen system 100 according to an embodiment. While the method is illustrated using the portable movie screen system 100, it will be appreciated that portable movie screen system may be any portable movie screen system and/or cover member disclosed herein. The method includes providing the support body 104 in the collapsed configuration and the cover member 102 with the flap member 122 in the open position as shown in FIG. 2A. Next, the method includes positioning the support body 104 in the receiving space 118 as shown in FIG. 2B.

With the flap member 122 in the open position, the opening 120 may provide access to the receiving space 118. For example, the opening 120 may allow a user to insert the support body 104 into the receiving space 118 and/or remove the support body 104 from the receiving space 118. While the support body 104 can be in the collapsed configuration when it is positioned in the receiving space 118. The support body 104 can be in a state between the collapsed configuration and the expanded configuration when it is positioned in the receiving space 118. For example, the reduced volume of the support body support structure 104 may allow a user to more easily insert the support body 104 into the receiving space 118. The support body 104 can be in the expanded configuration when it is positioned in the receiving space 118 such that the support body 104 tensions the cover member 102 as it is inserted in the receiving space 118.

Next, the method may include moving the support body 104 to the expanded configuration as shown in FIG. 2C. The support body 104 can be moved to the inflatable state by inflating the support body 104. For instance, the support body 104 can be inflated orally or with an inflation device, such as an electric air pump, through the one or more valve members 124. The support body 104 can be configured to automatically inflate upon opening of the one or more valve members 124.

As the support body 104 is inflated in the receiving space 118, the increased internal pressure can expand and stretch the support body 104 to a desired volume and/or shape determined by the materials and construction of the support body 104. In the expanded configuration, the one or more valve members 124 may be operated to seal the air bladder such that the internal pressure in the support body 104 is maintained. The air pressure within the support body support structure 104 can be maintained without the need of noisy air blowers or the like, which, in turn, provides a quieter and more energy efficient viewing experience. The tightness of the cover member 102 and the internal pressure within the support body 104 in the expanded configuration can also provide additional overall support and rigidity to the cover member 102.

The support body 104 in the expanded configuration can push radially outward on the side portions 110 and/or the upper end portion 111 of the cover member 102 such that the side portions 110 and/or the upper end portion 111 provide tension to the frame portion 114 on the front portion 106, which, in turn, pulls radially on the screen portion 112 at substantially equal amounts in all directions within a general plane. Such tensioning of the screen portion avoids disruptive wrinkles or waves on the surface of the screen portion 112 that can result when the screen portion 112 is relaxed.

As noted above, the support body 104 can include internal baffling or pulling, such that the pressure exerted on the cover member 102 is directed generally along a plane parallel to the screen portion 112. Optionally, the method may further include additional tensioning of the screen portion 112 by manually pulling and adjusting the front portion 106 and/or the screen portion 112.

Figure 2D:
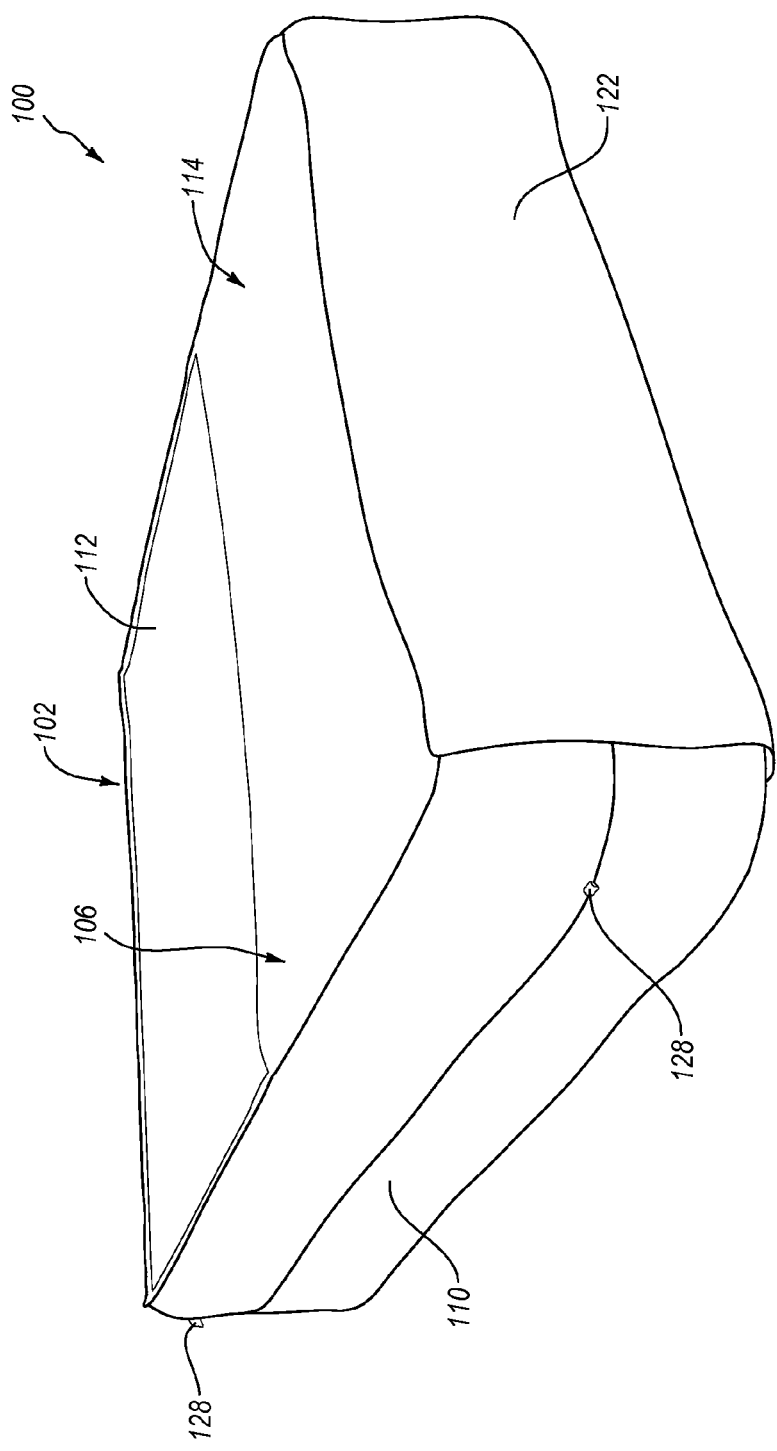

Next, the method may include moving the flap member 122 to the closed position. As shown in FIG. 2D, moving the flap member 122 to the closed position can include pulling the flap member 122 from the front portion 106 to the back portion 108. As the flap member 122 is pulled from the front portion 106 to the back portion 108, the flap member 122 can be pulled around an end wall 142 of the support body 104 and attached to the back portion 108. This can further tighten the screen portion 112 as the support body 104 pushes against the flap member 122 such that the flap member 112 pulls radially on the front portion 106.

The method may further include maintaining the portable movie screen system 100 in a generally upright position with tethers or other supporting elements. It will be appreciated that the method may be performed by an end user and/or manufacturer of the portable movie screen system 100. In the event that a user or manufacturer desires to remove the support body 104 from the cover member 102, the steps of the method may be generally performed in reverse order.

It will be appreciated that various schemes of assembly the system are contemplated, but the disclosure is not to be limited in any way by the method described.

Figure 3A:
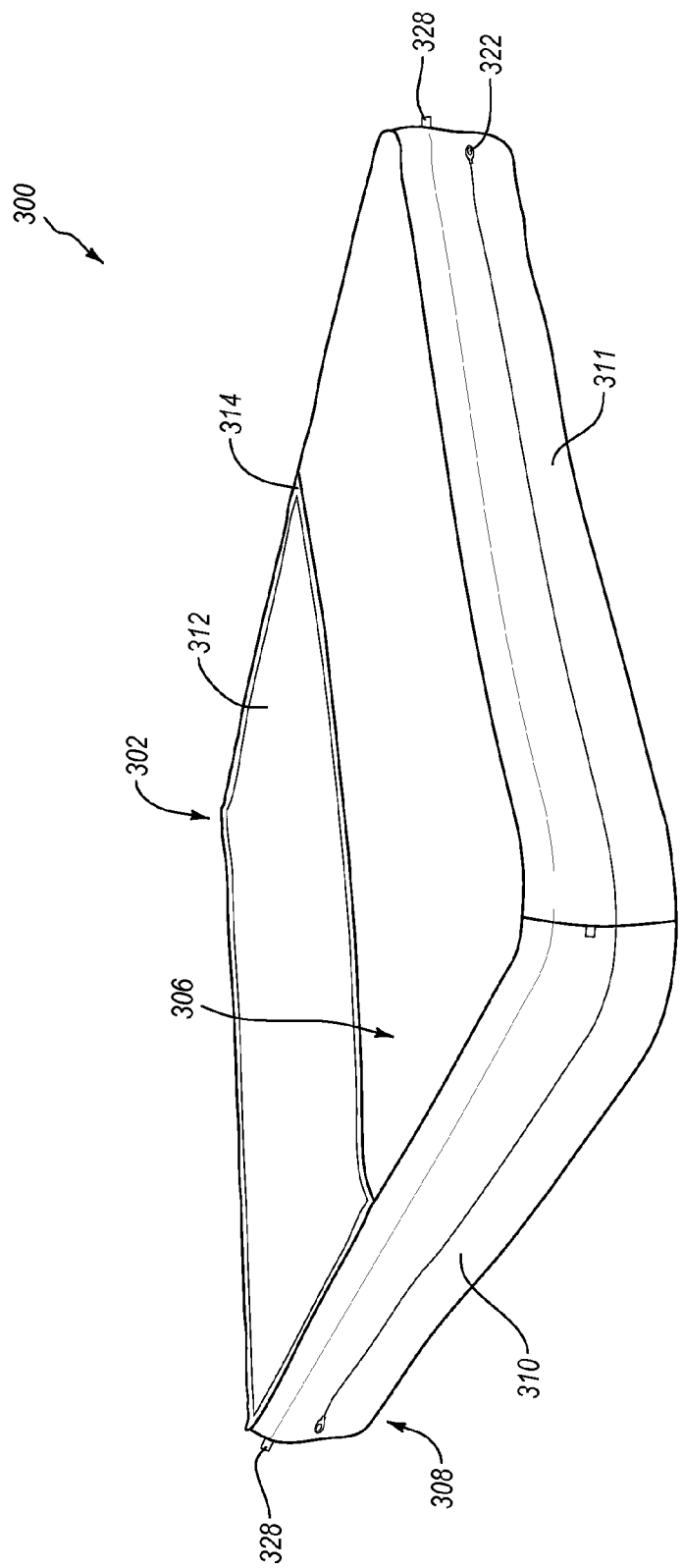
FIG. 3A is a bottom isometric view of a portable movie screen system according to another embodiment.
Figure 3B:
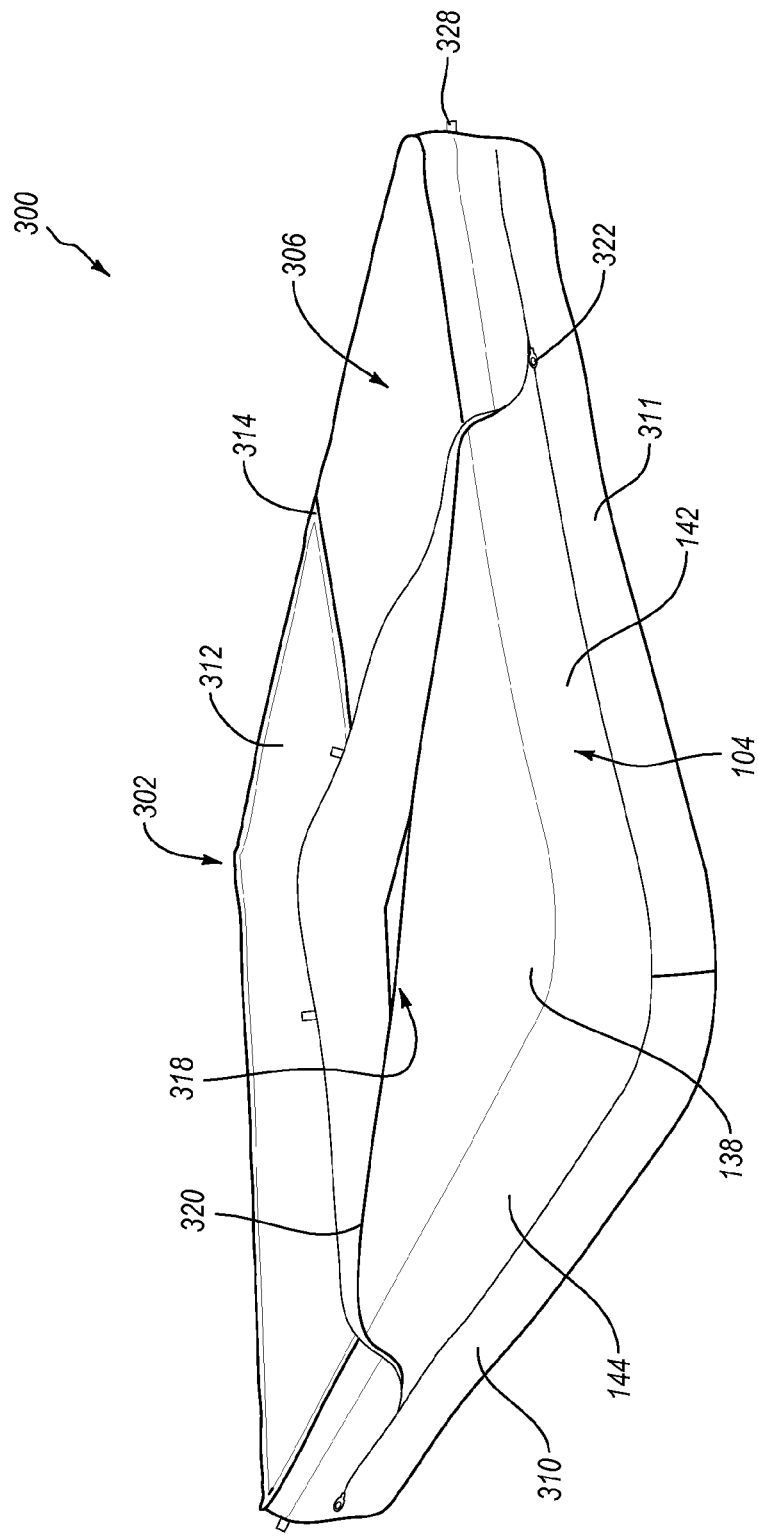
FIG. 3B is a bottom isometric view of the system shown in FIG. 3A with the cover member partially open.

Another embodiment of a portable movie screen system 300 in accordance with the present disclosure is shown in FIGS. 3A and 3B. The features of this embodiment of a portable movie screen system 300 are substantially similar to the embodiment described above. In the interest of brevity, similar features between the embodiments are not further discussed here.

The portable movie screen system 300 includes a cover member 302 and a support body 104. The cover member 302 can include a front portion 306, a back portion 308 generally opposite the front portion 306, and opposing side portions 310 and opposing end portions 311 extending between the front portion 306 and the back portion 308.

The side portions 310 and the end portions 311 may be connected to the front portion 306 in any suitable manner. An edge of the side portions 310 and/or the end portions 311 may be connected to an edge portion of the front portion 306 via stitching thereby forming one or more seams between the front portion 306 and the side portions 310 and/or the end portions 311. The back portion 308 may be connected to the side portions 310 and/or the end portions 311 in any suitable manner.

The side portions 310 and the end portions 311 may comprise a single member extending between the front portion 306 and the back portion 308. The side portions 310 and the end portions 311 may comprise two, three, four, or any other suitable number of members extending between the front portion 306 and the back portion 308. The side portions 310 and/or the end portions 311 may be integral to the front portion 306 and/or the back portion 308. The cover member 302 may include any suitable material. For example, one or more portions of the cover member 302 may be formed of a PVC or nylon material and/or one or more stretchy materials.

The front portion 306 can include a generally rectangular screen portion 312 and a frame portion 314 surrounding at least part of the periphery of the screen portion 312. It will be appreciated that the screen portion 312 and/or the frame portion 314 may be the same or similar in many respects to any of the screen portions and/or frame portions discussed above. For instance, the screen portion 312 may be white or off white and integral to the front portion 306, fixedly attached to the front portion 306, or removably attached to the front portion 306.

Together, the front portion 306, the back portion 308, the side portions 310, and the end portions 311 may at least in part define a receiving space 318 within the cover member 302. An opening 320 may be formed in the side portions 310 and the lower end portion 311 of the cover member 302. The opening 320 may be configured to provide access to the receiving space 318. The opening 320 may comprise a split in the side portions 310 and the lower end portion 311 of the cover member 302.

The opening 320 may comprise a split in the end portions 311 and one of the side portions 310. In yet other embodiments, the opening 320 may comprise a split in the front portion 306 and/or the back portion 308. In other embodiments, the opening 320 may be formed in any other suitable location on the cover member 302. The cover member 302 may include the same materials as the cover member 102. For example, the cover member 302 may include PVC material or nylon material.

The support body 104 is selectively positionable within the receiving space 318 of the cover member 302 through the opening 320 and movable between the collapsed configuration and the expanded configuration. Similar to the cover member 102, the cover member 302 may include one or more closure elements configured to selectively close and open the opening 320.

The one or more closure elements can comprise a zipper system 322 including mating portions extending along opposite edges of the opening 320. The zippers 322 can allow the opening 320 to be closed by securing the edges of the opening 320 together as shown in FIG. 3A. This can help secure and/or protect the support body 104 in the receiving space 318.

With the zippers 322 unzipped, the receiving space 318 of the cover member 302 may be exposed and/or accessed by a user. More particularly, with the zippers 322 unzipped, at least a portion of the front portion 306 or the back portion 308 can be pulled back or folded onto itself thereby the receiving space 318 as shown in FIG. 3B.

Optionally, the zippers 322 may be waterproof or water resistant. While the closure element is shown as a zipper system, other closure elements are possible such as magnets, buttons, snaps, clasps, latch systems, VELCRO® (a hook-and-loop type closure system), combinations thereof, or any other suitable closure element.

To assemble the portable movie screen system 300, the support body 104 can be moved to the expanded configuration. The support body 104, for example, can be inflated with an inflation/deflation device. With the zipper 322 unzipped, the support body 104 in the expanded configuration can then be inserted into the receiving space 318 through the opening 320. The mating portions of the zipper 322 can then be zipped together to pull the opening 320 closed.

The tightness of the cover member 302 and the internal air pressure in the support body 104 can provide overall support and rigidity to the cover member 302. With the zipper closed 322 and the support body 104 received in the receiving space 318, the support body 104 in the expanded configuration can push on the side portions 310 and the end portions 311 so that the side portions 310 and/or the end portions 311 pull radially on the front portion 306 and the frame portion 314, which, in turn, automatically and/or selectively provide tension to the screen portion 312. This has the effect of tightening the screen portion, which, in turn, reduces wrinkles and flattens out the screen portion 312. Such a configuration also protects the support body 104 because the cover member 302 fully encloses the sealed inflatable member 104 with the opening 320 closed.

Figure 4A:
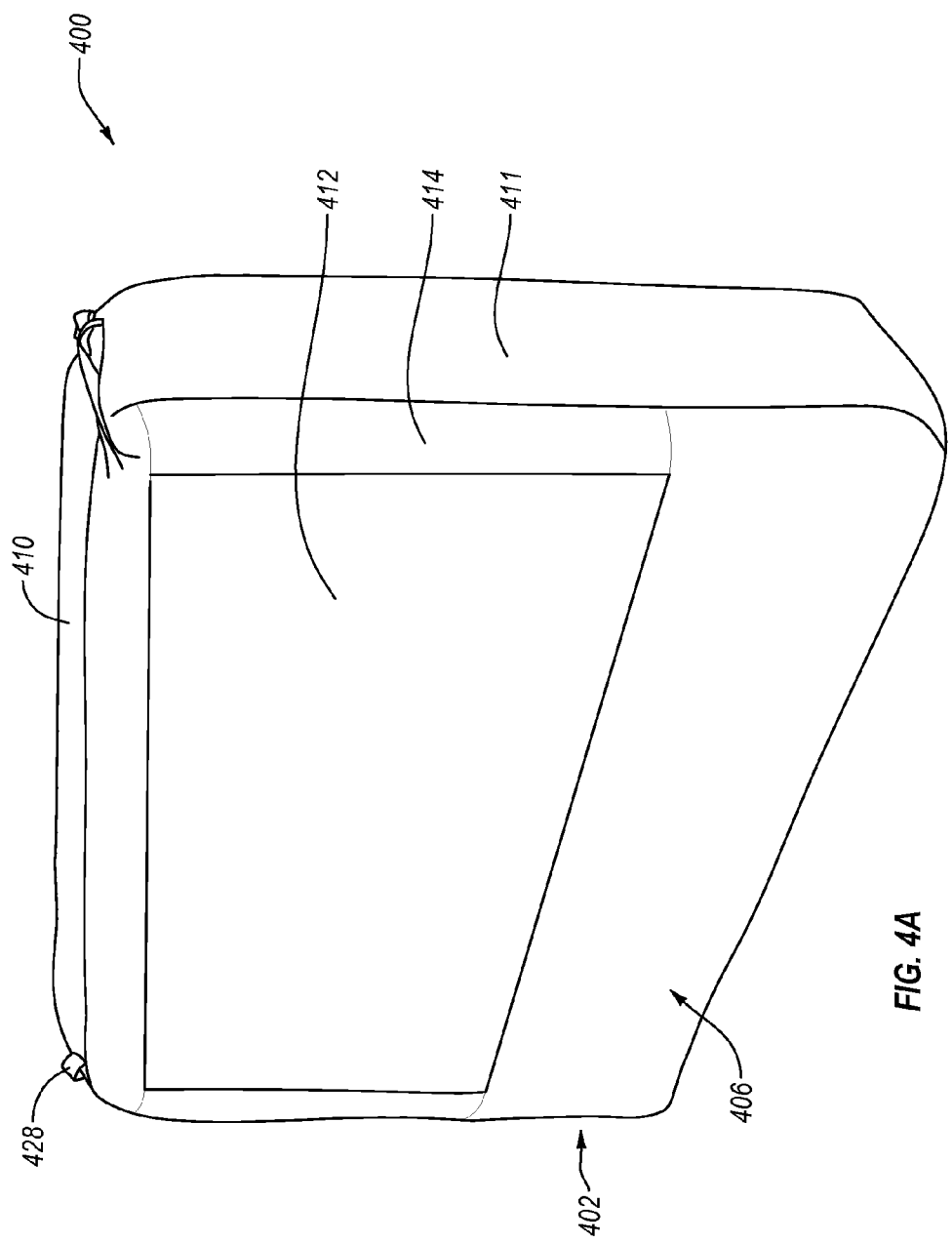
FIG. 4A is a front isometric view of a portable movie screen system according to another embodiment.
Figure 4B:
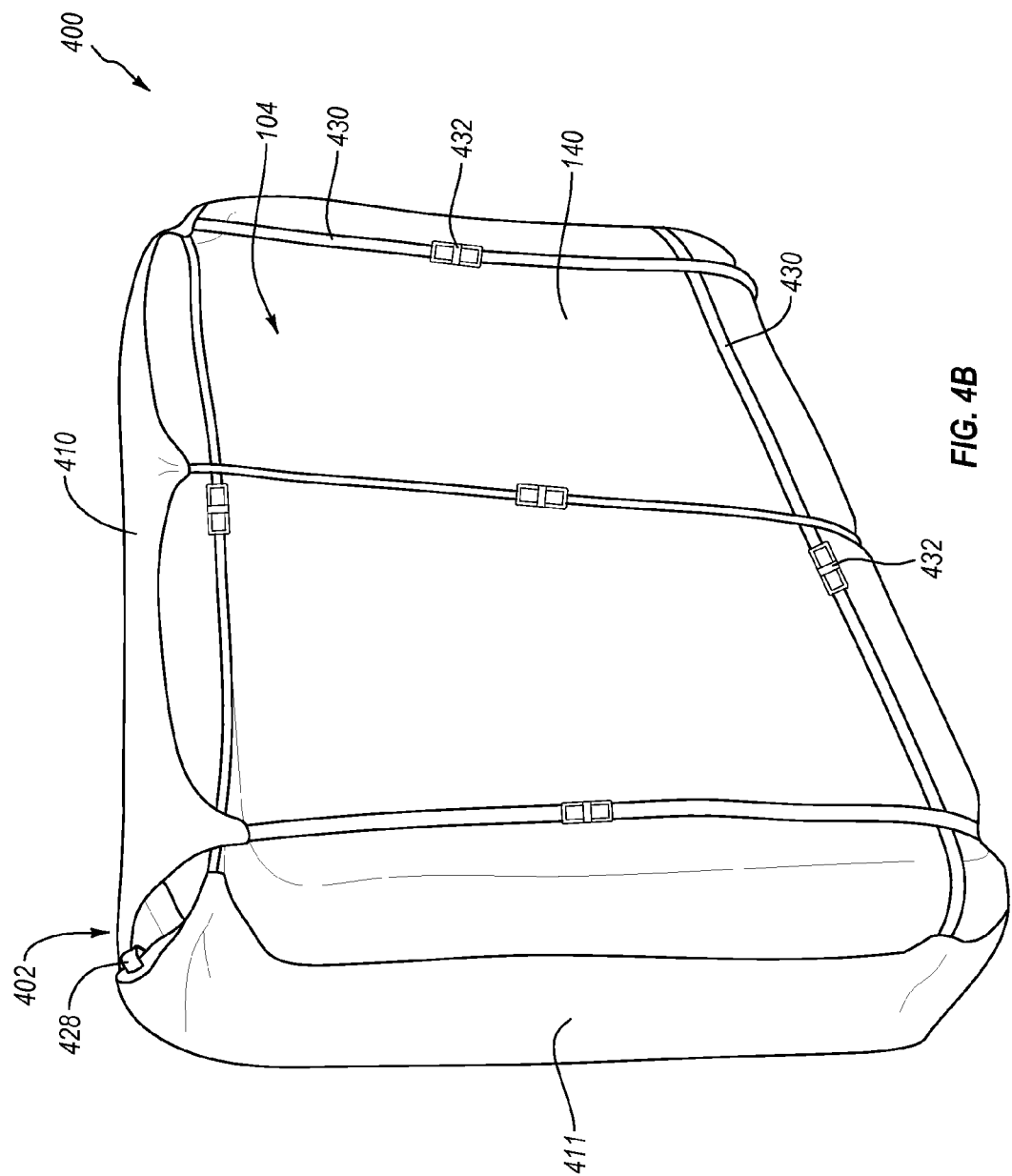
FIG. 4B is a back isometric view of the system shown in FIG. 4A.

Another embodiment of a portable movie screen system 400 in accordance with the present disclosure is shown in FIGS. 4A through 4B. Many of the features of this embodiment are substantially similar to the embodiments discussed above. Therefore, in the interest of brevity, components of the portable movie screen systems 100, 300, and 400 that are identical or similar to each other have been provided with the same reference numbers, and an explanation of their structure and function will not be repeated unless the components function differently.

The portable movie screen system 400 includes a cover member 402 and a support body 104. As shown, the cover member includes a front portion 406 having a screen portion 412 and a frame portion 414 surrounding the screen portion 412. It will be appreciated that the screen portion 412 and/or the frame portion 414 may be the same or similar in many respects to any of the screen portions and/or frame portions discussed above. For instance, the screen portion 412 be made from a stretchy white or off white material with a slight reflective quality and may be integral to the front portion 406, fixedly attached to the front portion 406, or removably attached to the front portion 406.

The cover member 402 may further include opposing side flap members 410 attached to the front portion 406 and opposing end flap members 411 attached to the front portion 406. Each of the flap members 410, 411 may be pivotally attached to the front portion 406. The side flap members 410 and the end flap members 411 may be connected to the front portion 406 in any suitable manner.

An edge portion of the side flap members 410 and/or the end flap members 411 may be connected to an edge portion of the front portion 406 via stitching thereby forming one or more seams between the front portion 406 and the side flap members 410 and/or the end flap members 411. In other embodiments, the side flap members 410 and/or the end flap members 411 may be connected to the front portion 406 via adhesives, mechanical fasteners, clips, snaps, buttons, VEL-CRO, combinations thereof, or any other suitable type of connection.

Each of the side flap members 410 and/or the end flap members 411 may comprise a single member extending from the front portion 406. Each of the side flap members 410 and/or the end flap members 411 may comprise two, three, four, or any other suitable number of members. The side flap members 410 and/or the end flap members 411 may be integral with the front portion 406. The side flap members 410 may have a height that is substantially the same as the height of the front portion 406 and the end flap members 411 may have a width that is substantially the same as the width of the front portion 406.

The cover member 402 can exhibit a cross-like shape when the flap members 410, 411 are positioned in the same plane as the front portion 406. It will be appreciated that the cover member 402 can exhibit a variety of different shapes. For example, the cover member 402 can exhibit a flower-like shape, or an elliptical shape. The side flap members 410 and the end flap members 411 may exhibit other sizes.

Together, the front portion 406, the side flap members 410, and the end flap members 411 may at least in part define a receiving space 418 (shown in FIG. 5C) of the cover member 402. The side flap members 410 and the end flap members 411 may be raised or rotated relative to the front portion 406 around the end walls 442 and the side walls 144 of the support body 104 to form the receiving space 418.

The receiving space 418 can vary in size and/or shape. For example, the cover member 402 may include one or more elastic or stretchy materials that allow the receiving space 418 to change its size and/or shape in response to forces exerted on the cover member 402 by the support body 104. The cover member 402 can include one or more materials configured to provide additional rigidity to the cover member 402. The cover member 402 can be tightened onto the support body 104.

The cover member 402 may include one or more features configured to facilitate tightening of the cover member 402 onto the support body 104. For example, the cover member 402 may include one or more tensioning members. The one or more tensioning members comprise one or more adjustable strap members 430 and one or more connectors 432 to securely tighten the cover member 402 onto the support body 104. The one or more tensioning members can include netting, an elastic backing, elastic cords, tie downs, combinations thereof, or any other suitable tensioning means to facilitate tightening of the cover member 402 onto the support body 104.

It will be appreciated that the tightness of the cover member 402 and the internal pressure of the support body 104 in the expanded configuration can provide overall support and rigidity to the cover member 402.

Referring to FIG. 4B, each of the side flap members 410 can include three strap members 430 and three connectors 432 and each of the end flap members 411 can include two strap members 430 and two connectors 432. The number and location of connectors 432 and/or strap members 430 can vary from one implementation to the next. To tighten the cover member 402 onto the support body 104, one or more of the strap members 430 can be secured and tensioned across the back wall 140 of the support body 104.

The strap members 430 can be tensioned and secured across the front wall 138 of the support body 104. In the expanded configuration, the straps 430 can be adjusted such that the support body 104 pushes radially outward on at least the flaps members 410, 411, which, consequently, pull on the front portion 406 and the frame portion 414. Such tensioning of the screen portion 412 helps avoid the wrinkles that can result when the screen portion 412 is not appropriately taut.

The tensioning of the screen portion 412 can be adjusted and customized by increasing or reducing the pull from one or more of the flap members 410, 411 on the front portion 406. One or more of the flap members 410, 411 may include one or more materials configured to provide a level of rigidity to the flap members 410, 411. For example, in an embodiment, one or more of the flap members 410, 411 can include a material configured to pull on the front portion 406 without stretching. One or more of the flap members 410, 411 can include stretchy materials such as spandex.

The connectors 432 can be a snap-type connector where the connectors on one side of the cover member 402 are female connectors that connect with corresponding male connectors on the other side of the cover member 402. Other types of connectors 432 such as VELCRO®, hooks, snaps, ratchets, or other similar connectors can be used.

Alternatively, the strap members 430 can include a length adjuster such that a user can customize the length and/or tension on the strap members. Moreover, the strap members 430 can come in various lengths to fit various sizes of sealed inflatable bodies 104. The same cover member 402 can be used with two or more sealed inflatable bodies that have large differences in their size without the need to buy a new cover member 402.

Figure 4C:
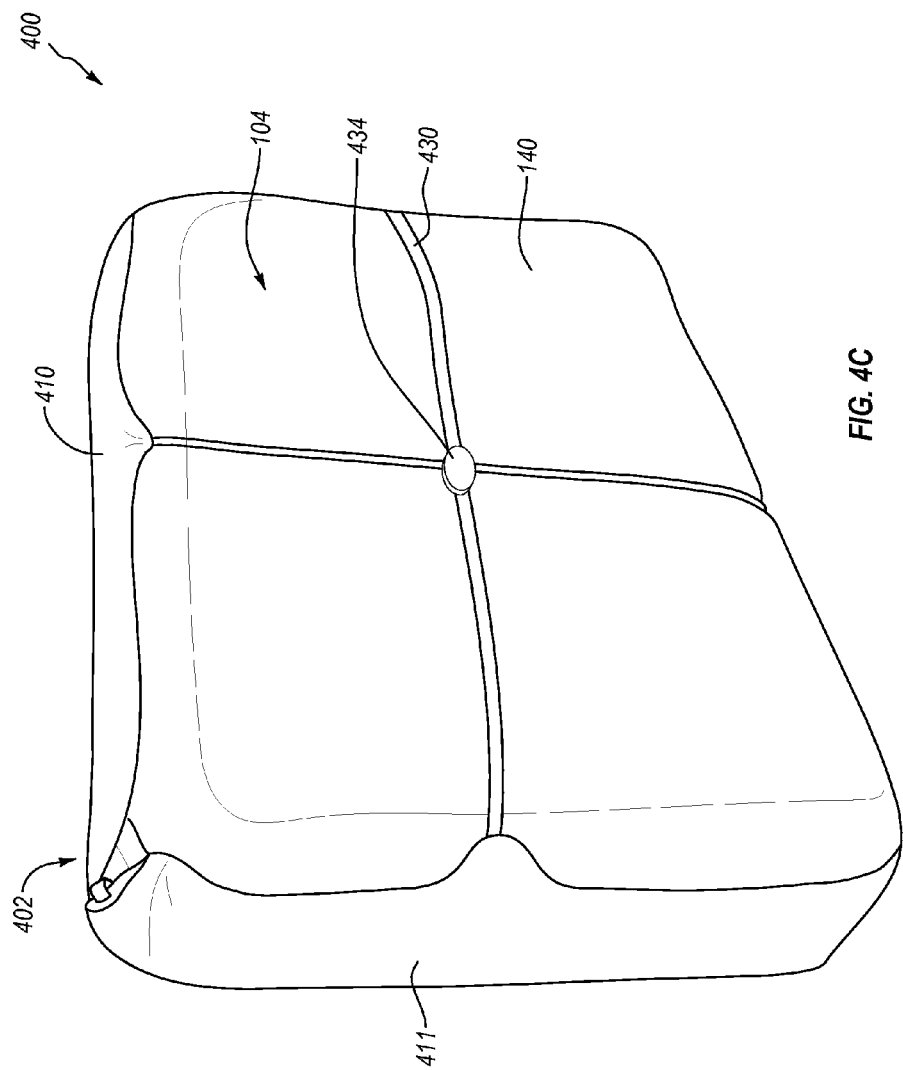
FIG. 4C is a back isometric view of the system shown in FIG. 4A according to another embodiment.

In other embodiments, the cover member 402 may include four strap members 430, each having a first end attached to one of the flap members 410, 411 and a second end attached to a central connector 434 suspended near a center of the front portion 406 as shown in FIG. 4C. To customize the length and/or tension the strap members, the central connector 434 can be configured to selectively ratchet around an axis thereby wrapping or unwrapping the strap members 430 about the axis. Thus, the central connector 434 can adjust the length of all of the strap members 430 and customize tensioning in a single action.

Optionally, the front portion 406 may include one or more sleeve members surrounding at least a portion of the periphery of the screen portion 412. One or more pole members may be insertable into the one or more sleeve members to tighten, straighten, and or flatten the screen portion 412. The one or more pole members may include a curved pole that stresses the one or more sleeve members away from the screen portion 412 such that the one or more sleeve members tighten, straighten, and/or flatten the screen portion 412. The one or more poles may be inserted into the sleeve members when the cover member 402 is tightly secured on the support body 104. The one or more poles may be inserted into the sleeve members when the cover member 402 is not secured on the support body 104.

The portable movie screen system 400 can include any number of features to facilitate maintenance of the portable movie screen system 400 in a generally upright position. A set of optional elongate members (not shown) can connect to rings 428 (shown in FIG. 4B) or other suitable connectors at or near the upper end flap member 411 of the cover member 402. The elongate members (e.g., ropes, wires, cords) can be angled upward where they can be secured to a support such that the portable movie screen system 400 can be hung from the support. For example, the support may include an awning of a recreational vehicle.

It will be appreciated that the support may include a wall surface, a tree, a railing on a house boat, or any other suitable support. Alternatively, rings 428 or other connectors can be provided toward the lower end flap member 411. Tethers may then be extended downward therefrom and tensioned in any suitable manner. For example, weights may be hung from the bottom tethers. The bottom tethers can be secured to the ground or another support surface. Instead of tethers, stakes or other securement devices (e.g., weights, water ballasts, and sand bags) may also be connected directly to the rings 428 so as to maintain the portable movie screen system 400 in a generally upright position.

Figure 5B:
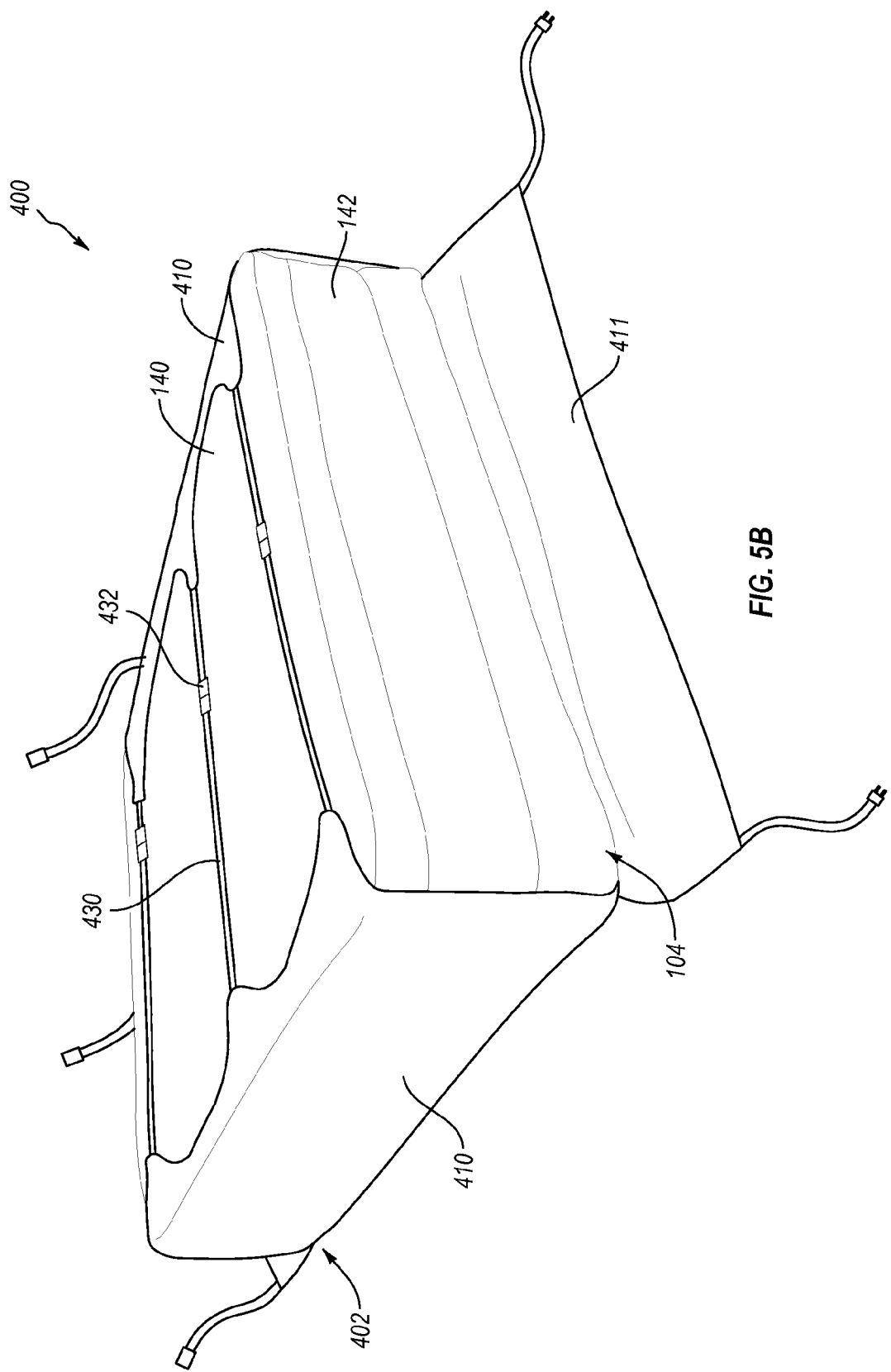
Figure 5C:
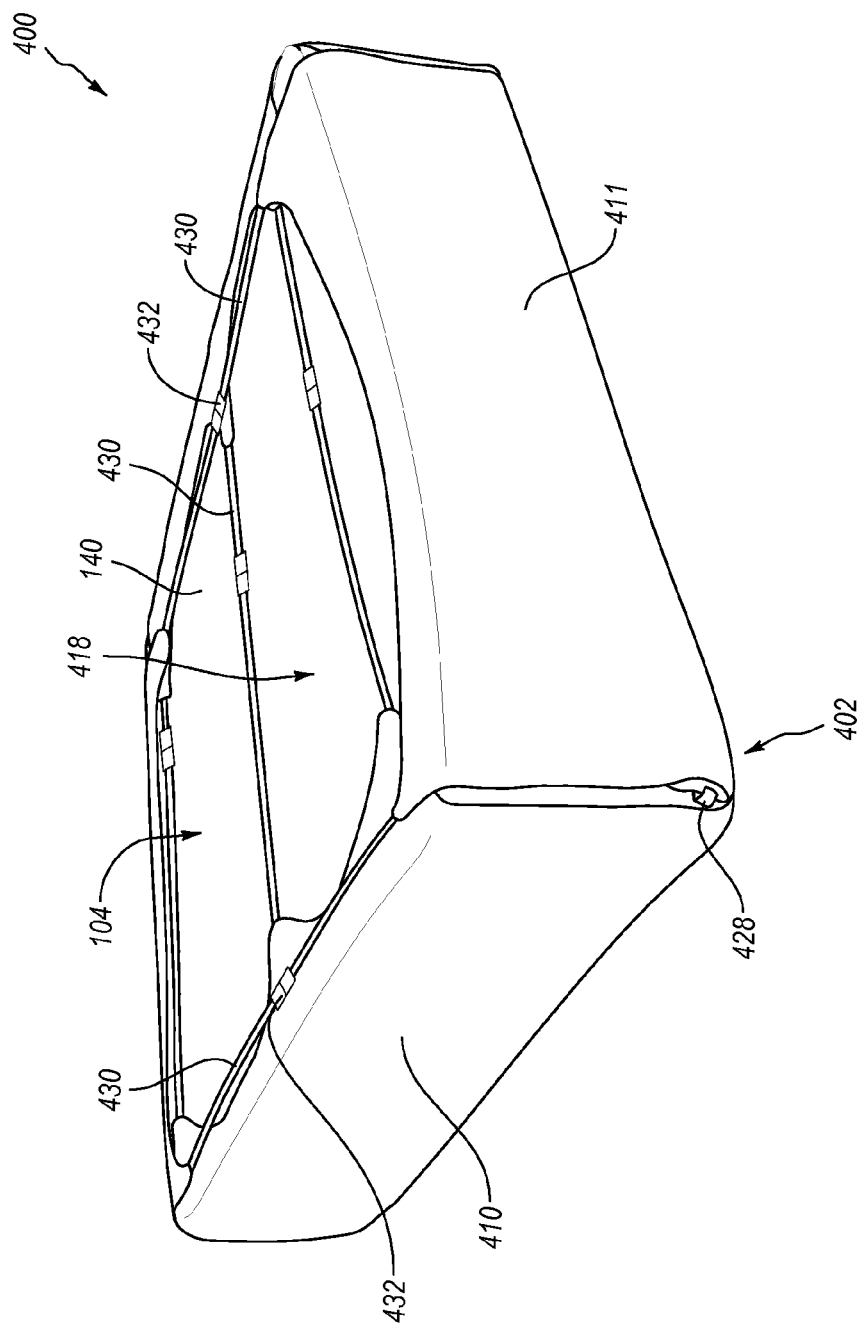

Another exemplary embodiment of an assembly method is illustrated in FIGS. 5A through 5C. While the method is illustrated using the portable movie screen system 400, it will be appreciated that portable movie screen system may be any portable movie screen system and/or cover member disclosed herein.

The method includes providing the support body 104 in the expanded configuration and the cover member 402 in a generally planar configuration as shown in FIG. 5A. As shown, the support body 104 is positioned on a surface of the cover member 402 generally opposite the screen portion 412.

Next, the method includes raising or rotating the side flap members 410 up from the front portion 406 and around at least the side walls 144 of the support body 104 as shown in FIG. 5B. The one or more strap members 430 of the side flap members 410 can then be extended across the back wall 140 of the support body 104. In an embodiment, the strap members 430 of the side flap members 410 can be connected to one another via the connectors 432 and tensioned as desired.

Next, the method includes raising or rotating the end flap members 411 up from the front portion 406 and around at least the end walls 142 of the support body 104 as shown in FIG. 5C. The one or more strap members 430 of the end flap members 411 can then be extended across the back wall 140 of the support body 104.

The strap members 430 of the end flap members 411 can be connected to one another via the strap members 430 and the connectors 432 and tensioned as desired. Adjustment of the strap members 430 can be via the length adjusters. In addition, by adjusting one or more of the strap members 430, the tensioning of the screen portion 412 can be adjusted and customized by increasing or reducing the pull from one or more of the flap members 410, 411 on the front portion 406. The cover member 402 can be tightened onto the support body 104 providing support to the cover member 402, tension to the screen portion 412, and/or an improved viewing experience.

Because the system 400 does not require a power source, noisy blowers, or special equipment, the system 400 is lighter in weight, easier to use, and quieter than conventional inflatable screens. For example, in an embodiment the system 400 may weigh less than about 100 pounds, less than about 50 pounds, less than about 25 pounds, less than about 10 pounds, or less than about 5 pounds. In other embodiments, the system 400 may weigh more or less.

Optionally, the method may further include maintaining the portable movie screen system 400 in a generally upright position with tethers or other supporting elements. It will be appreciated that the method may be performed by an end user and/or manufacturer of the portable movie screen system 400. In the event that a user or manufacturer desires to remove the support body 104 from the cover member 402, the steps of the method may be generally performed in reverse order.

While the strap members 430 are illustrated being connected together in a particular order, it will be appreciated that the strap members 430 may be connected together in any suitable order or pattern. For example, the strap members 430 can be connected in a clockwise or counterclockwise pattern. The strap members 430 can be connected together in a random pattern. While the support body 104 is illustrated being provided in the expanded configuration, in other embodiments, the support body 104 may be provided in the collapsed configuration and inflated after the strap members 430 and the flap members 410, 411 are connected and/or tensioned.

Another embodiment of a portable movie screen system 600 in accordance with the present disclosure is shown in FIGS. 6A through 6D. Many of the features of this embodiment are substantially similar to the embodiments discussed above. Therefore, in the interest of brevity, components of the portable movie screen systems 100, 300, 400, and 600 that are identical or similar to each other have been provided with the same reference numbers, and an explanation of their structure and function will not be repeated unless the components function differently.

Figure 6A:
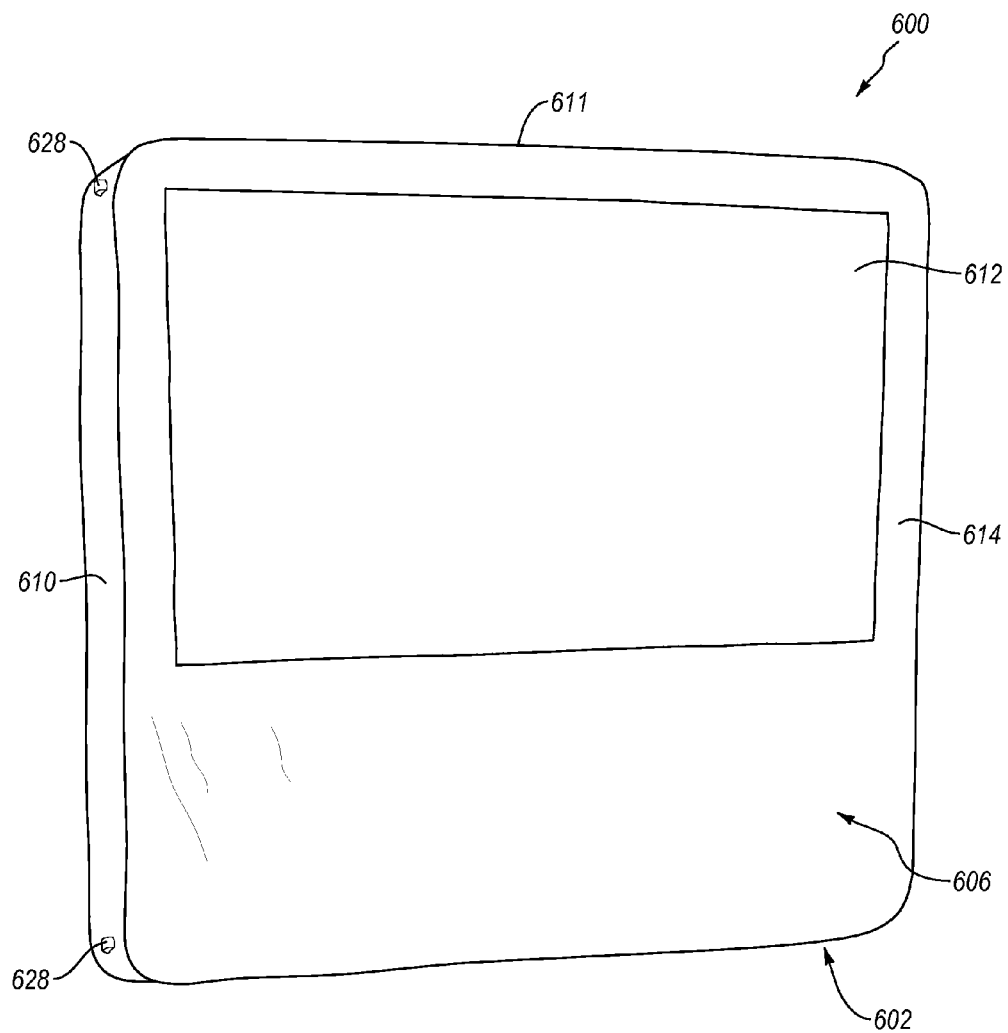
FIG. 6A is a front isometric view of a portable movie screen system according to another embodiment.
Figure 6B:
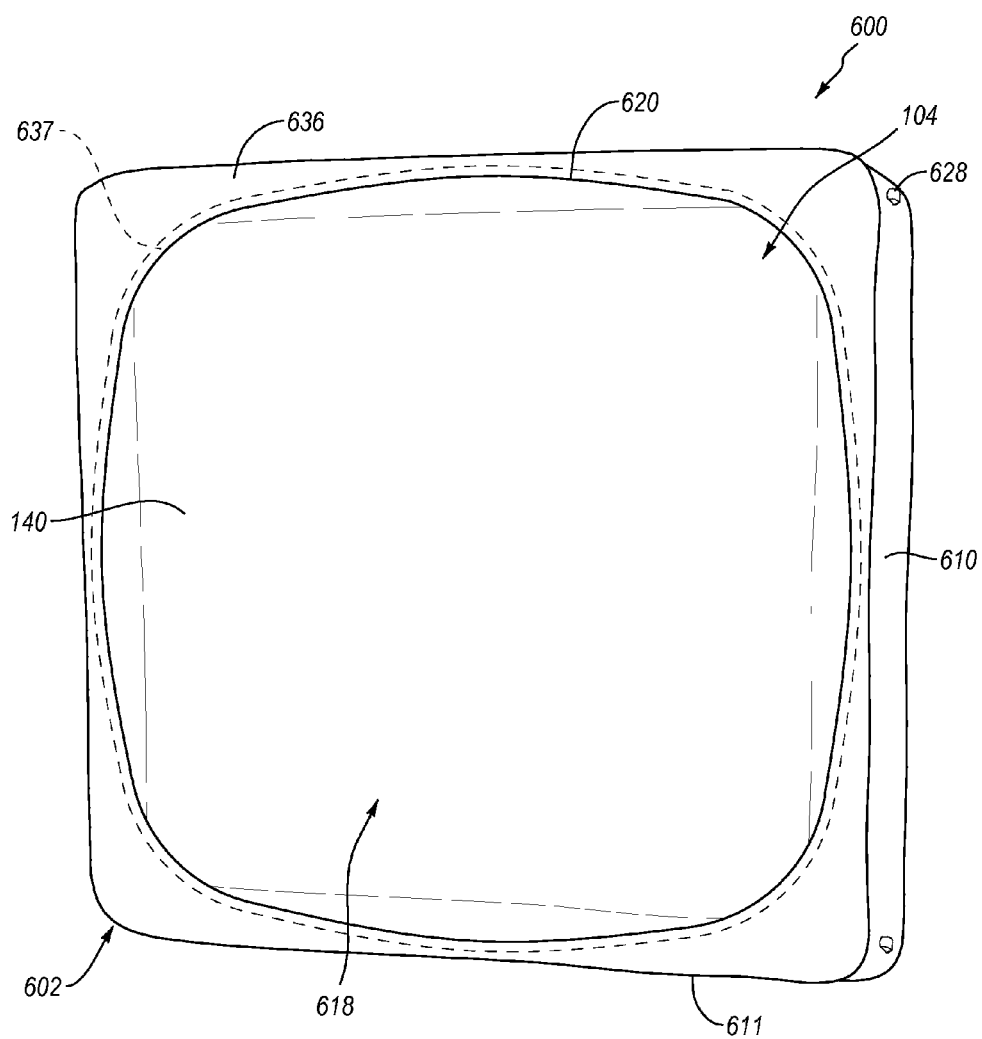
FIG. 6B is a back isometric view of the system shown in FIG. 6A.

Referring to FIGS. 6A and 6B, the cover member 602 can include a front portion 606 and opposing side portions 610 and opposing end portions 611. The side portions 610 and the end portions 611 may be connected to the front portion 606 and may extend generally downward therefrom. A lip portion 636 may be connected to the side portions 610 and the end portions 611 generally opposite the front portion 606. The lip portion 626 can also be sized and configured to extend under the support body 104 or at least in part over the front wall 138 or the back wall 140 of the support body 104. Such a configuration can provide a protective barrier between the support body 104 and the ground or other underlying surface.

Together, the front portion 606, the side portions 610, the end portions 611, and the lip portion 636 can at least in part define a receiving space 618 within the cover member 602. The receiving space 618 can be configured to selectively receive the support body 104. The lip portion 636 can define an opening 620 configured to provide access to the receiving space 618.

The lip portion 636 may include at least one tensioning member 637 configured to help tighten the cover member 602 over the support body 104. The tensioning member 637 can comprise an elastic band, a bungee cord, a drawstring, a draw chord, a nylon cord, a rope, combinations thereof, or any other suitable member. The tensioning member 637 may run along a portion or the entirety of a sleeve formed within the lip portion 636. However, it will be appreciated that in other embodiments the tensioning member may run along or be located in any suitable portion of the lip portion 636.

As seen in FIG. 6A, the front portion 606 can include a screen portion 612 and a frame portion 614 at least on a part surrounding the screen portion 612. It will be appreciated that the screen portion 612 and/or the frame portion 614 may be the same or similar in many respects to any of the screen portions and/or frame portions discussed above. For instance, the frame portion 614 may be formed from a black facing material and the screen portion 612 and may be made from a white or off white material attached to the frame portion 614 and including a slight reflective quality for bright projection.

The screen portion 612 may comprise a high stretch or stretchy material such as a stretchy nylon, a stretchy woven material, stretchy polyester, spandex-type material, stretch vinyl, LYCRA®, cotton, combinations thereof, or any other suitable stretchy material. The frame portion 614 can include a low-stretch or non-stretchy material such as a non-stretchy nylon, PVC, or any other suitable material. The frame portion 614 may include a non-stretchy mesh material. This can increase airflow through the cover member 602, which, in turn, limits disturbance and/or increases stability in windy conditions.

In an embodiment, the screen portion 612 can exhibit a stretch and elasticity that is greater than that of the frame portion 614. The frame portion 614 may exhibit an elastic modulus that is about 1.1, about 1.5, about 5, or about 10 times greater than the elastic modulus of the screen portion 612. The elastic modulus is a measure of the amount of force per unit area (stress) needed to achieve a given amount of deformation. The frame portion 614 can have an elastic modulus that is between about 1.1 and about 50 times, about 1.3 and about 30 times, about 1.5 and about 20 times, or about 2 and about 10 times greater than the elastic modulus of the screen portion 612. In yet other embodiments, the frame portion 614 can exhibit an elastic modulus that is larger or smaller relative to the elastic modulus of the screen portion 612.

The screen portion 612 may exhibit an elastic limit that is greater than the elastic limit of the frame portion 614. The elastic limit is the maximum stress that can be applied to a material without undergoing permanent deformation. For example, the screen portion 612 may exhibit an elastic limit that is about 1.1, about 1.5, about 5, or about 10 times greater than the elastic modulus of the frame portion 614. The screen portion 612 can have an elastic limit that is between about 1.1 and about 50 times, about 1.3 and about 30 times, about 1.5 and about 20 times, or about 2 and about 10 times greater than the elastic limit of the frame portion 614. In yet other embodiments, the frame portion 112 can exhibit an elastic limit that is larger or smaller relative to the elastic limit of the screen portion 110.

The screen portion 612 may be configured to stretch and the frame portion 614 may be configured substantially not to stretch so that the frame portion 614 can selectively or automatically tension the screen portion and move and/or substantially maintain the screen portion 612 in a desired shape. By framing the more elastic screen portion 612 with the less elastic frame portion 614, the screen portion 612 can be tightened by the frame portion 614 without the sides or edges of the screen portion 612 being substantially deformed by the tension applied by the frame portion 614. For instance, the frame portion 614 can pull the screen portion 612 into a generally rectangular shape with generally straight vertical and horizontal sides. This advantageously helps keep the sides of the screen portion 612 from bowing, becoming wavy, or otherwise deforming to a level or degree that could distort an image projected thereon and/or negatively impact image quality. The tension applied to the screen portion 612 by the frame portion 614 can substantially flatten the screen portion 612. The tension applied to the screen portion 612 by the frame portion 614 can limit wrinkles in the screen portion 612. Alternatively, one or more edges of the frame portion 614 and/or the screen portion 612 may be slightly curved and/or flexible to allow tensioning to a desired shape. It will be appreciated in other embodiments the frame portion 614 may have a higher elasticity than the screen portion 612.

Referring again to FIG. 6B, the side portions 610 and the end portions 611 may be connected to the front portion 606 in any suitable manner. The side portions 610 and the end portions 611 may comprise a single band-like member extending from the front portion 606. The side portions 610 and the end portions 611 may comprise two, three, four, or any other suitable number of members extending from the front portion 606. The side portions 610 and the end portions 611 may be integrally formed with the front portion 606.

The side portions 610, the end portions 611, and/or the lip portion 636 can have an elasticity that is greater than the elasticity of the frame portion 614. The side portions 610, the end portions 611, and/or the lip portion 636 can include a high stretch or stretchy material similar to the screen portion 612. The elasticity of the side portions 610, the end portions 611, and/or the lip portion 636 can apply tension to the frame portion 614, which, in turn, can be transferred to the screen portion 612 through the frame portion 614. The tension on the frame portion 614 from the side and end portions 610, 611 in combination with the higher elastic modulus of the frame portion 614 can help pull radially on the screen portion 612 at substantially equal or controlled amounts in different directions. This has the effect of flattening the screen portion 612 and/or limiting wrinkles on the screen portion 612, substantially improving image quality. The elasticity of the side portions 610, the end portions 611, and/or the lip portion 636 can also allow the cover member 602 to stretch and/or shrink such that the cover member 602 can fit on support bodies of different sizes. It will be appreciated that in other embodiments, the elasticity of the frame portion 614 may be greater than the elasticity of the side portions 610, the end portions 611, and/or the lip portion 636.

The support body 104 in the expanded configuration can be positioned in the receiving space 618 such that the front wall 138 or the back wall 140 of the support body 104 is adjacent to the front portion 606 of the cover member 602. The support body 104 can be positioned on a surface of the front portion 606 that is opposite the screen portion 612. The side portions 610 and the end portions 611 can be positioned on the side walls 144 of the support body 104 and the lip portion 636 can be positioned to overlap at least a portion of the front wall 138 of the support body 104.

When the cover member 602 is positioned on the support body 104 in the expanded configuration, the cover member 602 may be sized or adjusted such that the support body 104 pushes on the side portions 610, the end portions 611, the front portion 606, and/or the lip portion 636. As the support body 104 pushes on the lip portion 636 and the front portion 606, the lip portion 636 can pull the front portion 606 toward the support body 104 and the front portion 606 can pull the lip portion 636 toward the support body 104 via the side portions 610 and the end portions 611. In addition, the support body 104 can push radially outward on the side portions 610 and the end portions 611, consequently, pulling on the frame portion 614 and tensioning the screen portion 612. This allows the screen portion 612 to be tightened without the use of continuous air flow as in the prior art, substantially decreasing the noise output from the system.

Figure 6C:
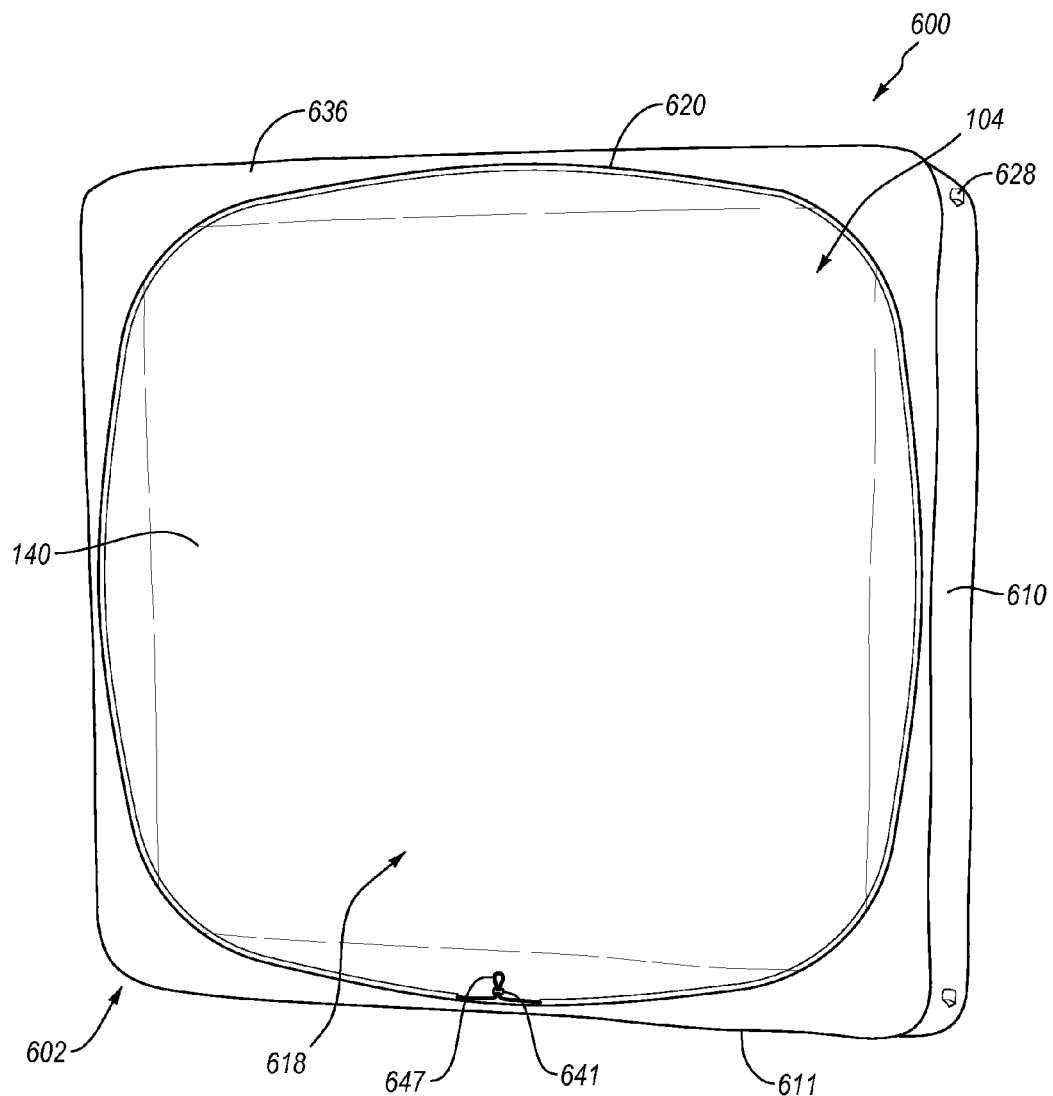
FIG. 6C is a back isometric view of the system shown in FIG. 6A according to another embodiment.

In an embodiment, the tensioning member can be adjustable. For instance, as shown in FIG. 6C, the tensioning member can comprise an elastic draw cord 647 and a cord lock 641 that can releasably hold the draw cord 647 in a generally tensioned state. To tighten the draw cord 647 on the support body 104, a user can pull upward on the draw cord 647 to achieve a desired tension. The user can then slide the cord lock 641 down over the draw cord 647 to secure the draw cord, maintaining the tension in the draw cord 647. To loosen the draw cord 647, the user can slide the cord lock 641 upward, releasing or decreasing the tension in the draw cord 647. This advantageously allows the fit of the cover member 602 to be adjusted so the cover member 602 can be used with support bodies of different sizes.

Figure 6D:
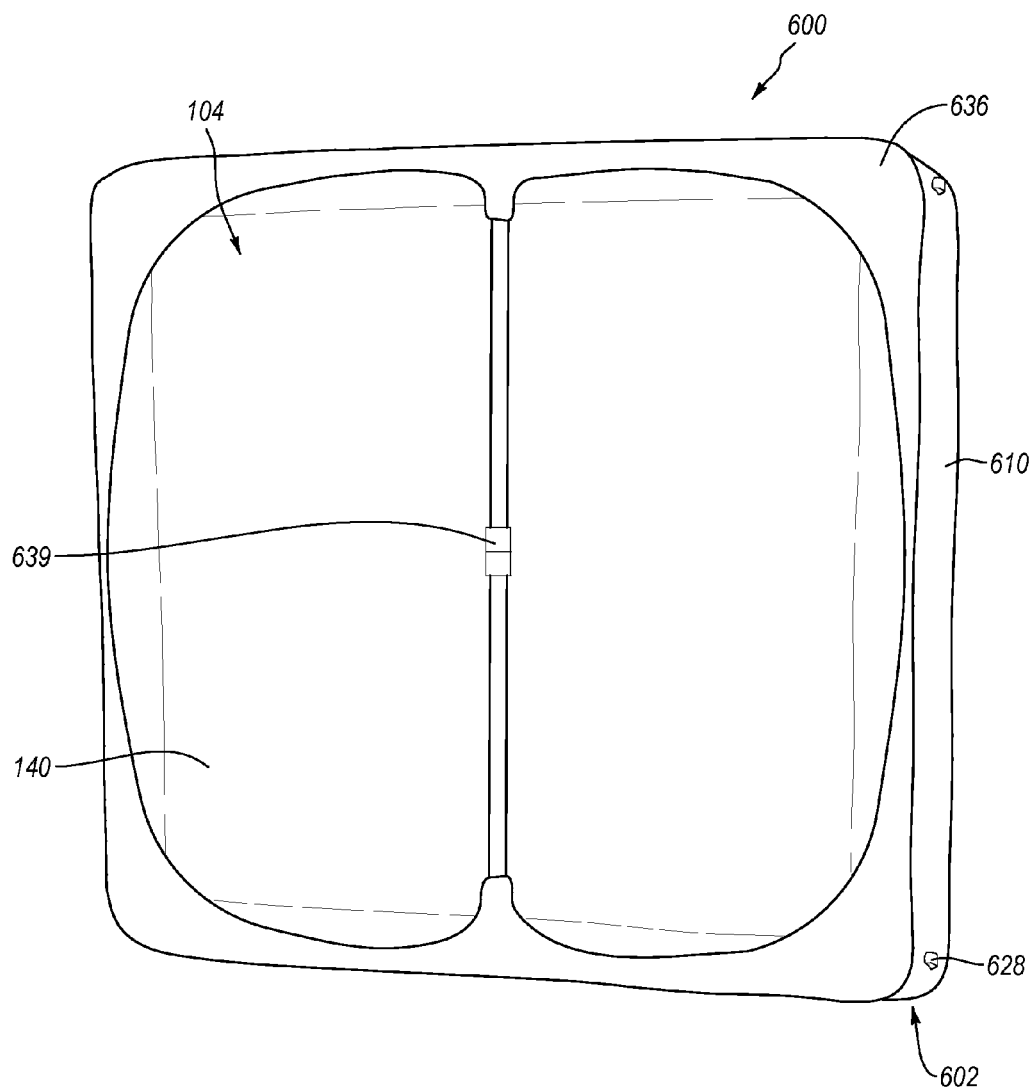
FIG. 6D is a back isometric view of the system shown in FIG. 6A according to another embodiment.

Alternatively, as shown in FIG. 6D, the cover member 602 may include an adjustable tie down member 639 that extends across the opening 620 and between the lip portion 636. The adjustable tie down 639 can be adjusted to further tension the screen portion 612, causing the side portions 610 and/or the end portions 611 to pull on the front portion 606. Additionally, the portable movie screen system 600 can include supporting elements to facilitate maintenance of the system 600 in a generally upright position. For example, the cover member 602 may include rings 628 or other suitable connectors such that the system 600 can be suspended in the air or staked to the ground.

Figure 7A:
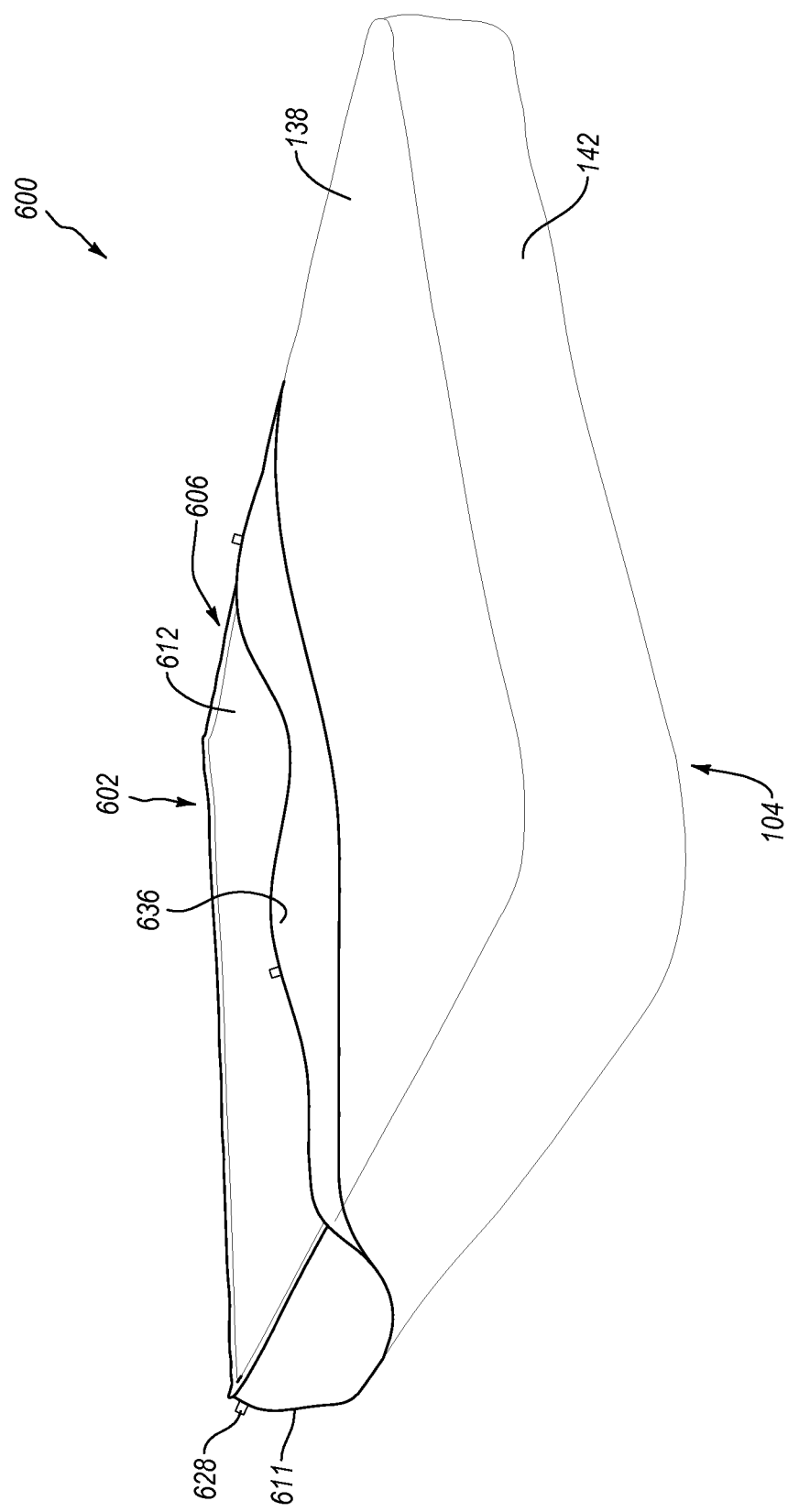
FIGS. 7A-7C illustrate a plurality of steps for assembling a movie screen according to an embodiment.
Figure 7B:
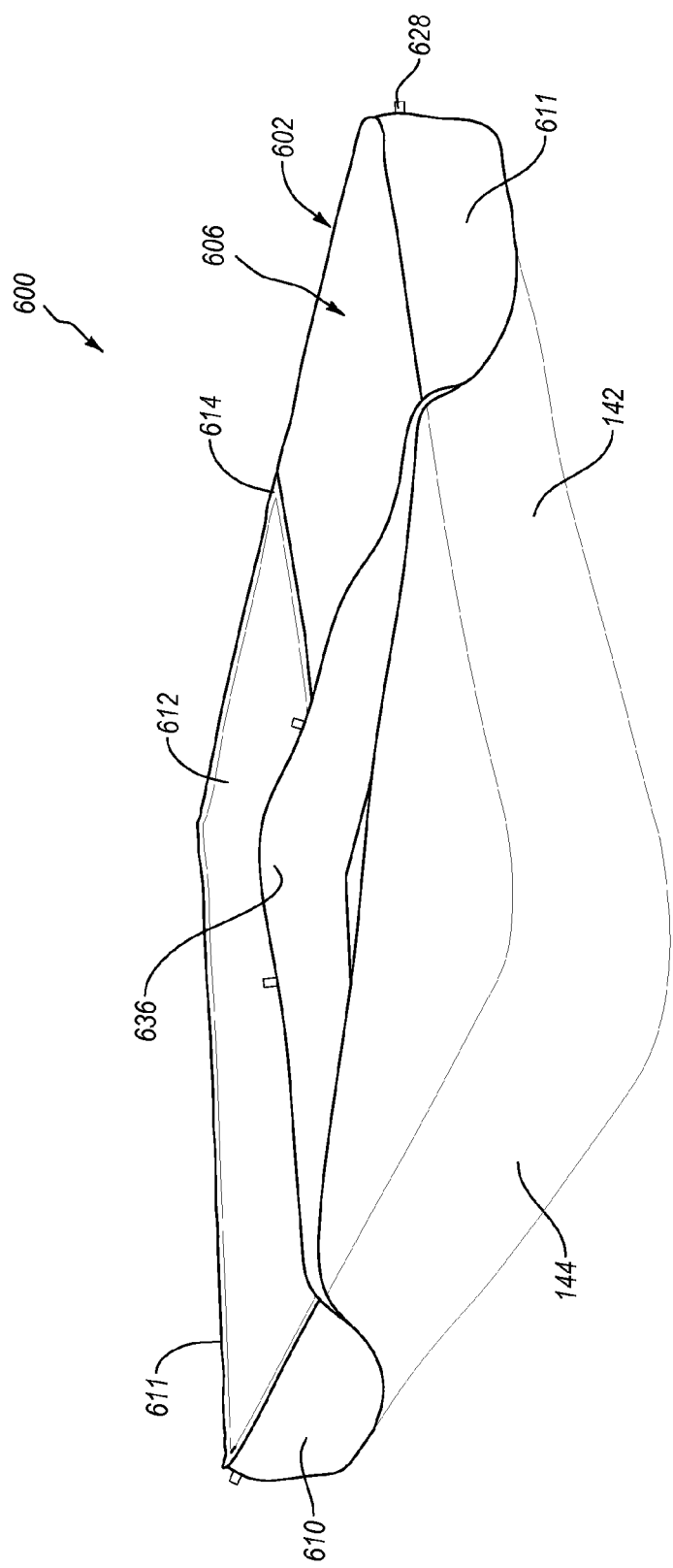
Figure 7C:
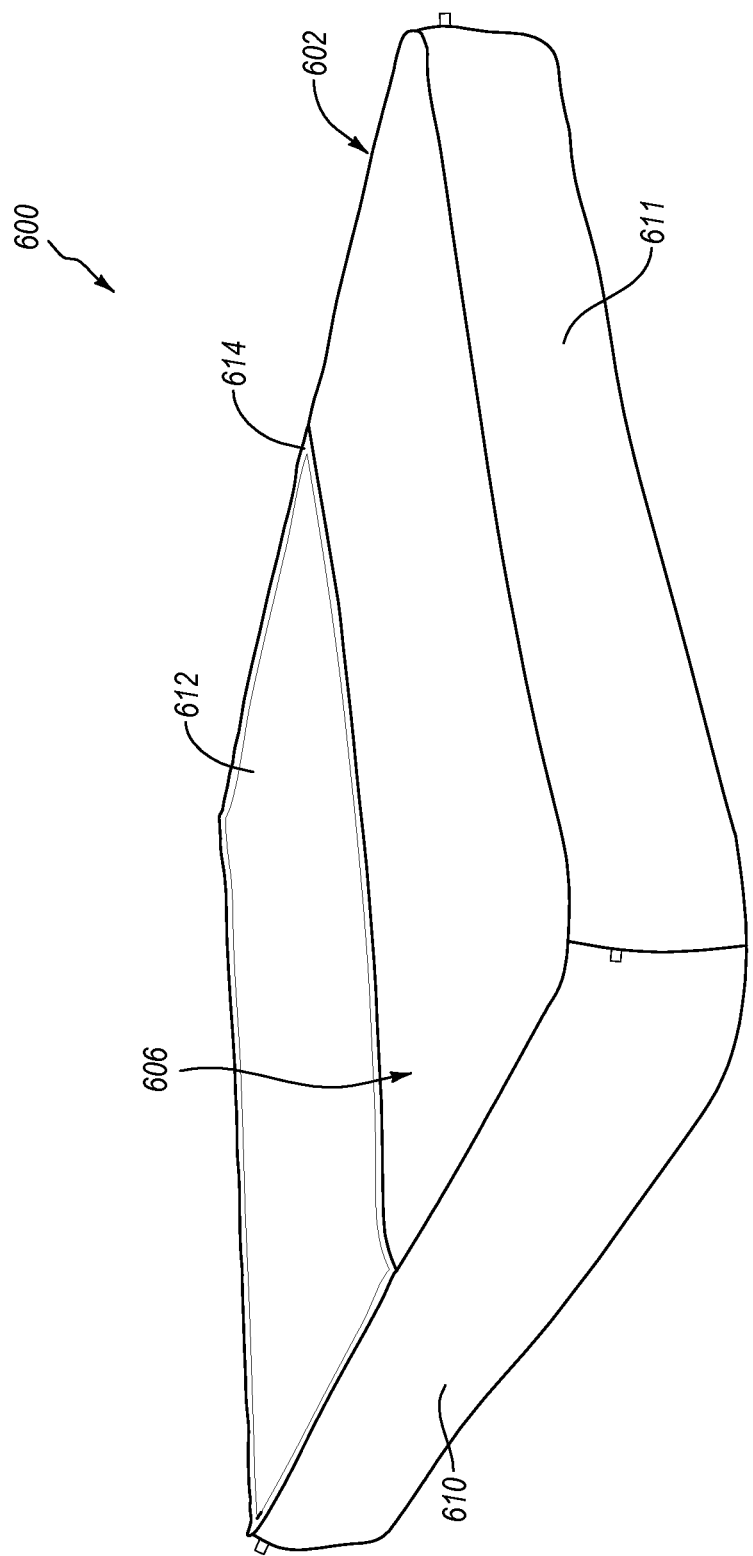

Another exemplary embodiment of an assembly method is illustrated in FIGS. 7A through 7C. While the method is illustrated using the portable movie screen system 600, it will be appreciated that portable movie screen system may be any portable movie screen system and/or cover member disclosed herein.

The method includes providing the support body 104 in the expanded configuration and the cover member 602. Next, the method includes positioning at least a portion of the front portion 606 and an end portion 611 of the cover member 602 on an end wall 142 and the front wall 138 of the support body 104 as shown in FIG. 7A.

Next, the method includes moving or pulling the front portion 606 over the front wall 138 of the support body 104 and positioning the lip member 636 on the back wall 140 of the support body 104 in manner such that the support body 104 is substantially positioned within the receiving space 618 of the cover member 602 as shown in FIG. 7B. As shown, the screen portion 612 is facing away from the support body 104. The opening 620 (shown in FIG. 6B) may provide access to the receiving space 618.

Next, the method includes pulling or positioning any remaining portions of the lip portion 636 over the back wall 140 of the support body 104. As shown in FIG. 7C, the opening 620 (shown in FIG. 6B) of the cover member 602 may be positioned over the sealable inflatable body 104 such that a portion of the sealable inflatable body 104 is left uncovered by the cover member 602. Once the cover member 602 is positioned on the sealable inflatable body 104, a user can adjust the cover member 602 to achieve a desired tautness, straightness, or flatness in the screen portion 612. In other embodiments, the user can adjust the tension in the tensioning member 637 to achieve a desired tautness, straightness, or flatness in the screen portion 612.

The support body 104 in the expanded configuration and within the cover member 602 can push on at least the side portions 610, which, in turn, radially pull on the frame portion 614 and/or front portion 606, automatically providing tension to the screen portion 612. Such automatic tensioning can avoid or reduce wrinkles or waves on the surface of the screen portion 612 that can result when the screen portion is not properly taut. It also can flatten out the surface of the screen portion 612, reducing image distortion. Moreover, because the system 600 does not require a noisy air blower and associated power source to tighten the screen portion 612, the system 600 is quieter and easier to use and it can provide the user or a user's audience with the freedom to use the system 600 almost anywhere. For instance, the system 600 can be set up camping, at the lake, on a playing field, in the desert, in a garage, in a barn, in a living room, off the power grid, and in other settings.

In the event that a user desires to remove the support body 104 from the cover member 602, the steps of the method may be generally performed in reverse order. While the support body 104 is shown positioned in the receiving space 618 in the expanded configuration, in other embodiments, the support body 104 may be positioned in the receiving space 618 in the collapsed configuration and subsequently inflated to the expanded configuration.

Figure 8A:
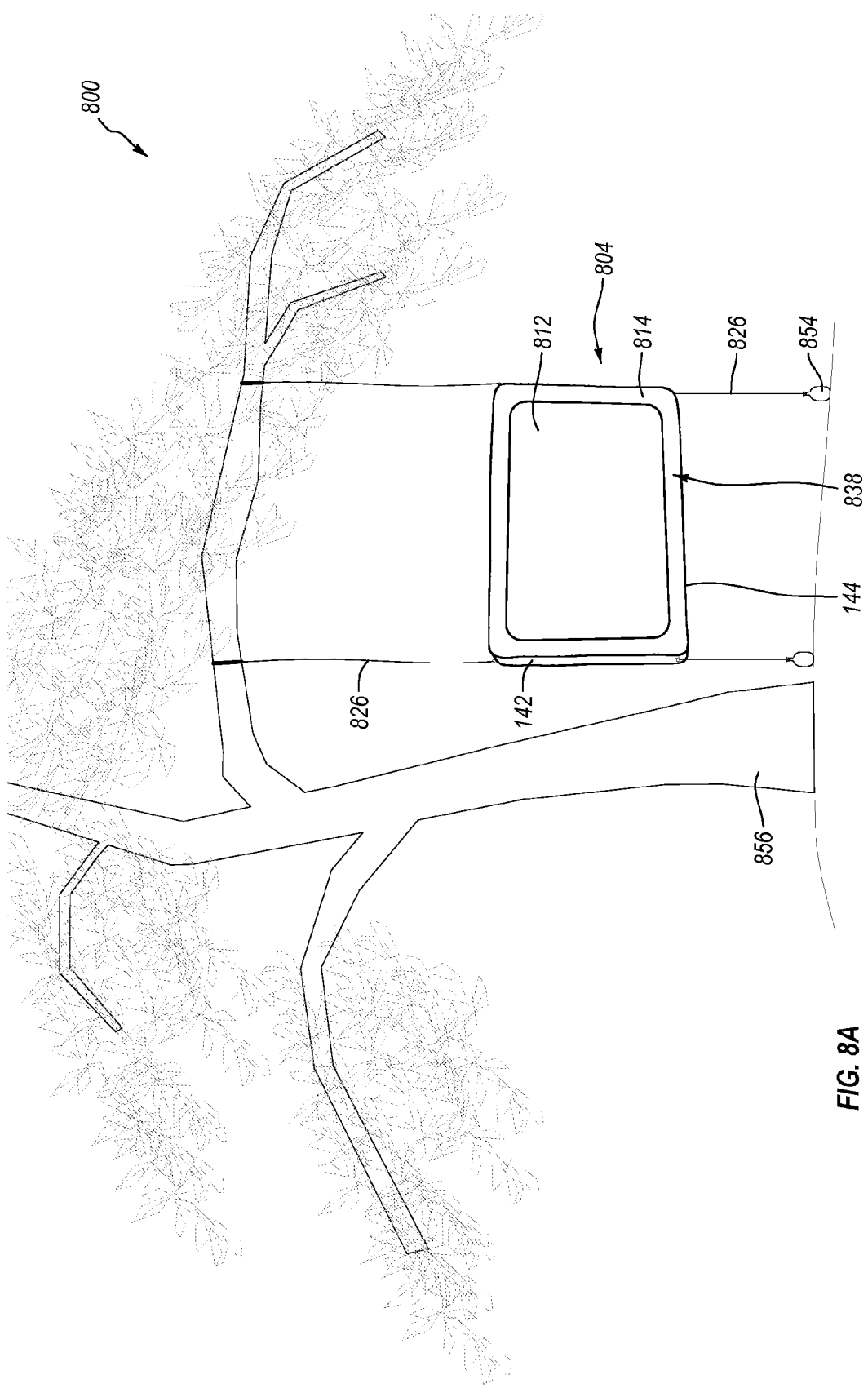
FIG. 8A is a front isometric view of a portable movie screen system according to another embodiment.
Figure 8B:
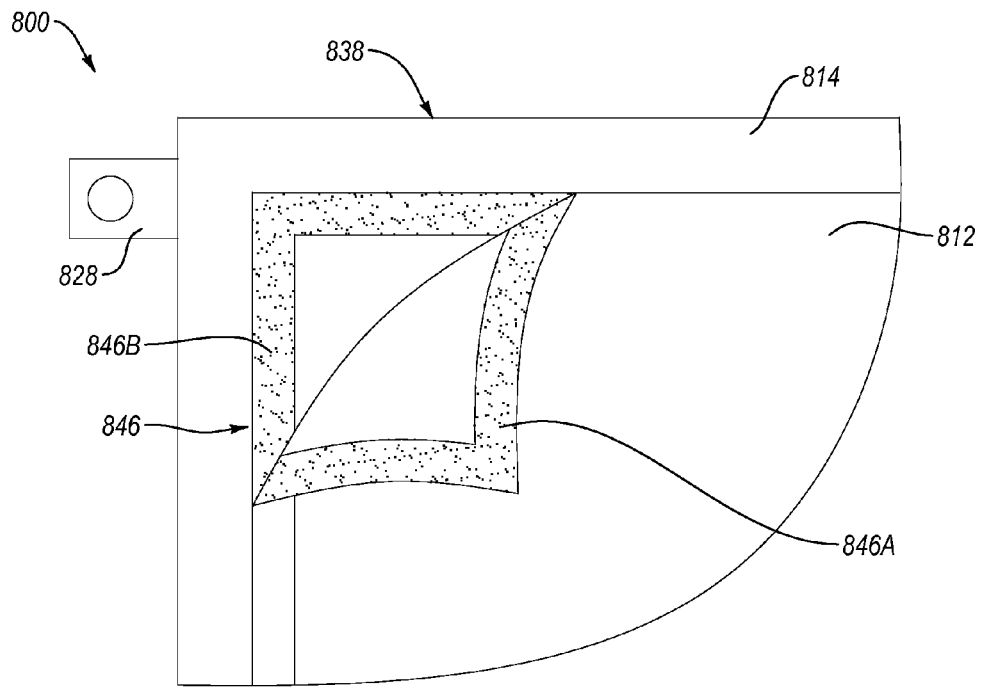
FIG. 8B is a detailed front isometric view of the system shown in FIG. 8A according to another embodiment.
Figure 8C:
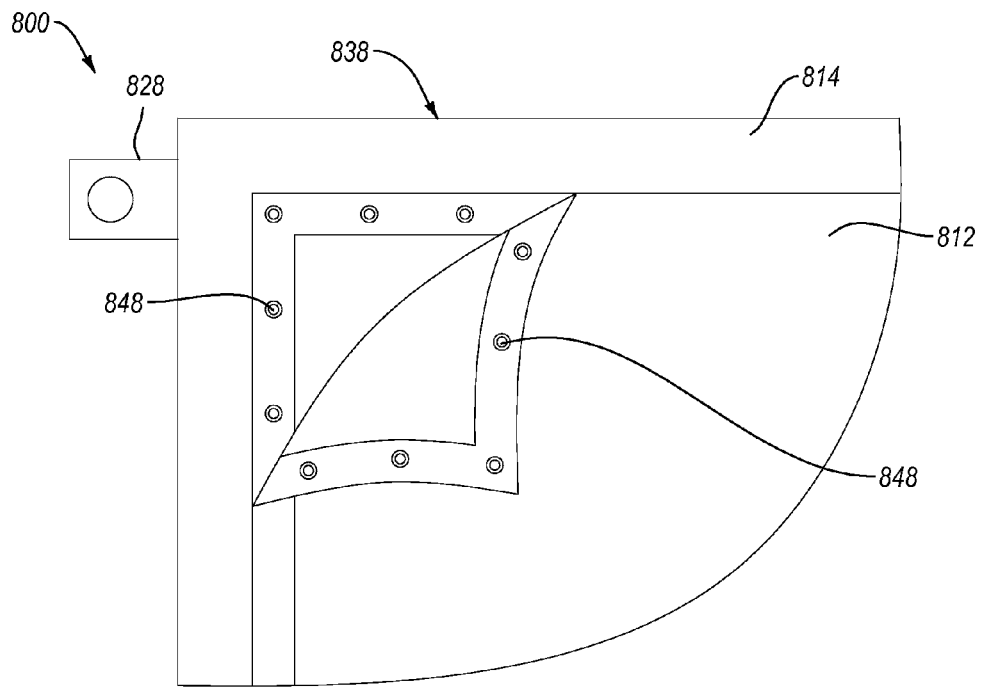
FIG. 8C is a detailed front isometric view of the system shown in FIG. 8A according to another embodiment.
Figure 8D:
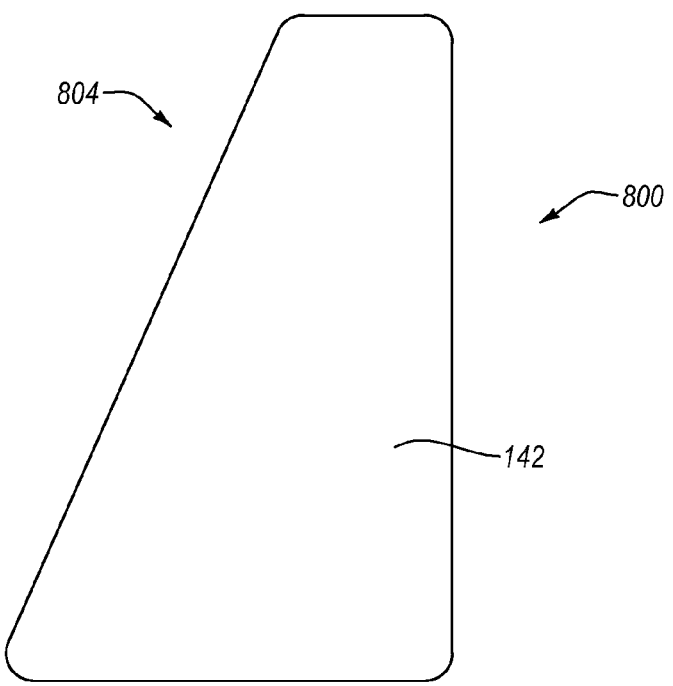
FIG. 8D is a side isometric view of the system shown in FIG. 8A according to another embodiment.
Figure 8E:
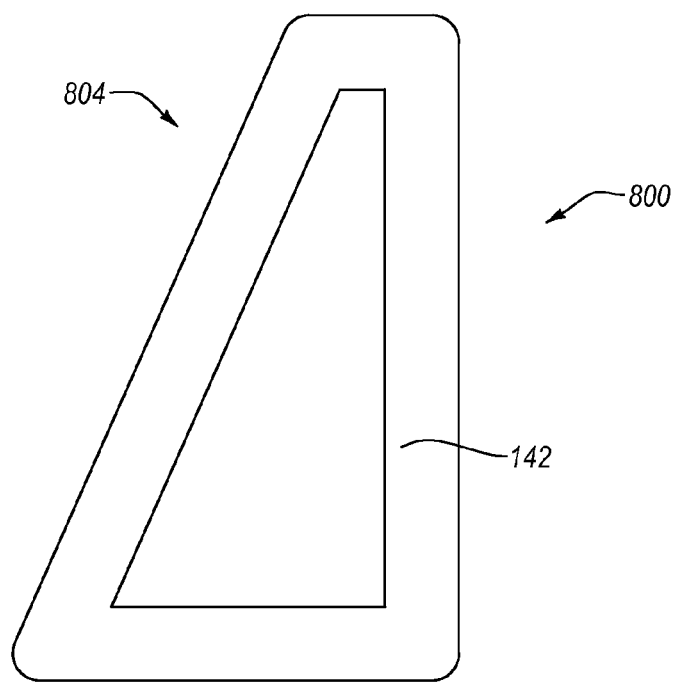
FIG. 8E is a side isometric view of the system shown in FIG. 8A according to another embodiment.

Another embodiment of an inflatable move screen system 800 in accordance with the present disclosure is shown in FIGS. 8A and 8E. Many of the features of this embodiment are substantially similar to the embodiments discussed above. Therefore, in the interest of brevity, components of the portable movie screen systems 100, 300, 400, 600, and 800 that are identical or similar to each other have been provided with the same reference numbers, and an explanation of their structure and function will not be repeated unless the components function differently.

The portable movie screen system 800 is similar to the previous embodiments except that the system 800 does not include a cover member and the screen portion is located on the support body. The support body 804 can include a front wall 838, a back wall, opposing end walls 842 and opposing side walls 844, to form an airtight chamber or air bladder. The air bladder can include one or more valve members which permit fluid flow into the air bladder, but prevent fluid flow out of the air bladder. The one or more valve members may be operable to permit release of fluid from the air bladder. The fluid can include air, water, gas, liquid, and/or any other suitable fluid.

Upon inflation, the support body 804 can maintain air pressure within the air bladder without the need of continuous air from an air blower. This reduces noise output from the system, which, in turn, can provide a more pleasant viewing experience. This also eliminates the need to have access to a power supply, substantially increasing the freedom of the user or user's audience to use the system 800 almost anywhere.

The support body 804 may be formed from any suitable material. For example, the support body 804 can be formed of a lightweight and durable material. In an embodiment, the system 800 including the support body 804 may weigh less than about 10 pounds, about 20 pounds, about 30 pounds, or about 54 pounds. In other embodiments, the system 800 may weight more or less.

At least one of the front wall 838 or the back wall can include a screen portion 812 and a frame portion 814. The screen portion 812 and/or the frame portion 814 may, in some cases, exhibit a configuration that is the same or similar to any of the screen portions and/or frame portions discussed above. For instance, the screen portion 812 may be configured as a projection or other type of viewing surface. The screen portion 812 may be generally white, off white, light grey, or any other suitable color. In the illustrated embodiment, the screen portion 812 exhibits a generally rectangular shape. The screen portion 812 may be square, trapezoidal, or have any other suitable shape. The screen portion 812 may include bowed corners. While reference is made herein to a rectangular shape, it should be appreciated that a rectangle should not be given any specific proportions and can include any sized rectangle, including a square with sides of generally equal lengths.

The screen portion 812 may be integral to the front wall 838 or the back wall. The screen portion 812 may be stamped, printed, or painted on the front wall 838 or the back wall. The screen portion 812 may be fixedly attached to the front wall 838 or the back wall. For example, the screen portion 812 may comprise a piece of material fixedly attached to the front wall 838 or the back wall.

The screen portion 812 may be removably attached to the front wall 838 or the back wall. In an embodiment, the screen portion 812 may be removably attached to the front wall 838 or the back wall via a hook-and-loop type system 846 (e.g., VELCRO) as shown in FIG. 8B. A first portion 846A of the hook-and-loop system 846 may be attached to the screen portion 812, while a mating second portion 846B of the hook-and-loop type system 846 is attached to the front wall 838 or the back wall. By connecting the first and second portions 846A, 846B of the hook-and-loop type system 846 around the perimeter of the screen portion 812, the screen portion 812 can be removably attached to the front wall 838 and/or the back wall.

It will be appreciated that the screen portion 812 may be removably attached to the front wall 838 or the back wall via other suitable connection types. As shown in FIG. 8C, the screen portion 812 can be removably attached to the front wall 838 or the back wall via snaps or buttons 848. This allows the screen portion 812 to be easily removed or attached. If the screen portion 812 gets wet or dirty, a user can remove the screen portion 812 to wash it or to store it separately to avoid buildup of mildew. Moreover, the screen portion 812 can be removed from the support body 804 and stored separately to help keep it from being wrinkled.

The support body 804 may be offered for sale with a plurality of different screen portions 812, each exhibiting a different gain, weight, fabric, or the like. This has the effect of providing a user or viewer the ability to customize the system 800 as desired. The portable movie screen system 800 may include screen portions 812 configured for use in different weather conditions. For example, the portable movie screen system 800 may include a winter screen portion 812 for use in the winter and a rain screen portion 812 for use in the rain. The user or viewer can attach one screen portion 812 or another to the front wall 838 and/or the back wall depending on the weather conditions.

If the screen portion 812 is damaged, the user may simply replace the screen portion 812 without having to purchase a whole new support body 804. Alternatively, the screen portion 812 may be sold separately from the support body 804.

The screen portion 812 may be reversible. For instance, the screen portion 812 may include a first projection surface on a first side having a high gain and a second projection surface on a second side having a low gain. Based on a viewer's preferences and/or ambient light conditions, the viewer can select the first side or the second to customize the screen portion 812 for viewing a movie or other presentation.

The first side of the screen portion 812 may include a projection surface and the second side can include a backing protective material. When the screen portion 812 is not in use, the viewer can attach the screen portion 812 to the front wall 838 and/or the back wall such that the projection surface is protected between the backing protective material and the front wall 838 and/or the back wall.

When the viewer desires to view a movie or other presentation on the screen portion 812, the viewer can reverse the screen portion 812 so that the projection surface is facing away from the front wall 838 and/or the back wall. Accordingly, the projection surface of the screen portion 812 can easily be used and/or protected from water, dirt, and debris.

Referring again to FIG. 8A, the frame portion 814 may extend about the screen portion 812. The frame portion 814 can include heavy-duty nylon, canvas, a rip-stop material, or other suitable material. The frame portion 814 may include a lightweight material configured to improve the portability of the support body 804.

The portable movie screen system 800 can also include a variety of supporting elements to facilitate maintenance of the support body 804 in a generally upright position. For example, a set of optional elongate members 826 are illustrated that connect to rings 828 (shown in FIG. 8B) or other suitable connecters at or near the end walls 842. The elongate members 826 can angle towards a support structure 856 (e.g., a tree branch) where they can be secured.

As seen, the portable movie screen system 800 can be hung generally upright from a support structure. Optionally, elongate members and/or weights 854 (e.g., water ballasts, sand bags, or metal members) may be hung from lower rings 828 to further stabilize the support body 804 in an upright position.

As noted above, the support body 804 may exhibit any number of different configurations. For example, the support body 804 may comprise a multi-use support body. The support body 804 may comprise a commercially available air mattress. For example, the support body 804 may comprise a twin air mattress, a full size air mattress, a queen air mattress, or a king air mattress. It will be appreciated that other air mattresses may be employed for the support body 804. The support body 804 may comprise a flotation device such as an inflatable raft. Alternatively, the support body 804 may be omitted. For example, the system 800 may use a conventional mattress and/or box springs as a support member for the cover 802. This allows the system 800 to be more versatile than in the prior art.

The support body 804 may be a dedicated support body. For example, the support body 804 may be manufactured specifically for use as a portable movie screen system. The support body 804 may be sized and configured to exhibit any suitable shape or size. The support body 804 may exhibit a generally truncated right triangular shape as shown in FIG. 8D. This has the effect of widening the base of the support body 804, which, in turn, facilitates the maintenance of the system 800 in a generally upright position.

In other embodiments, the support body 804 may exhibit a skeleton or frame-type configuration as shown in FIG. 8E. This has the effect of reducing the weight of the support body 804, which, in turn, makes transport and/or set up of the system 800 easier and less cumbersome.

Any of the embodiments for movie screen systems and cover members discussed above may be used in a movie display system. FIG. 9 is a top view of a movie display system 900 according to an embodiment. The movie display system 900 may include a portable movie screen 948. The portable movie screen 948 may be configured as any of the previously described portable movie screen system embodiments. As shown, the portable movie screen 948 can include one or more supporting elements to facilitate maintenance of the portable movie screen 948 in an upright position. As discussed above, the portable movie screen 948 does not require continuous air flow from an air blower. This allows the portable movie screen 948 to be made simpler than in the prior art, making the system weigh less, easier to set up, and quieter to operate.

A projector 950 may be positioned to project an image onto a screen portion of the portable movie screen 948. The projector 950 may project a movie, game, or other type of presentation on the screen portion of the portable movie screen 948 to an audience with a viewing area 958. In an embodiment, the projector 950 can be internally integrated within a multi-media presentation platform. For example, the projector 950 may be internally integrated within a multi-media presentation platform disclosed in U.S. patent application Ser. No. 12/697,811, filed Feb. 1, 2010, the disclosure of which is incorporated herein, in its entirety, by this reference.

The system 900 may further include one or more loudspeakers 952 configured to play audio to the audience. In other embodiments, the system 900 may include a number of other components. For example, the system 900 may include a number of different audio-visual components, such as, for example, a DVD player, a media-player, and an audio mixer.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A portable movie screen comprising:
    a front portion including a screen portion and a frame portion surrounding at least part of the periphery of said screen portion, said screen portion having a screen gain greater than about 0.8 and an elasticity that is greater than an elasticity of said frame portion;
    at least one side portion connected to said front portion; and
    a receiving space defined at least in part by said front portion and said at least one side portion, said receiving space configured to selectively receive a support body including at least one sealed chamber and movable between a collapsed configuration and an expanded configuration,
    wherein said frame portion is configured such that when the support body is in the expanded configuration and positioned in said receiving space, said frame portion tensions said screen portion and substantially maintains said screen portion in a desired shape.

2. The portable movie screen of claim 1, wherein said at least one side portion has an elasticity greater than said frame portion.

3. The portable movie screen of claim 1, wherein the support body in the expanded configuration pushes said at least one side portion radially outward, which, in turn, pulls said frame portion radially outward.

4. The portable movie screen of claim 1, wherein the tension from said frame portion limits wrinkles in said screen portion.

5. The portable movie screen of claim 1, wherein the tension from said frame portion substantially flattens said screen portion.

6. The portable movie screen of claim 5, wherein said screen portions includes at least one of micro-reflective beads, silica, metallic materials, nylon, magnesium carbonate, or titanium dioxide.

7. The portable movie screen of claim 1, wherein said gain of said screen portion is greater than about 0.9.

8. The portable movie screen of claim 1, wherein an elastic modulus of said frame portion is between about 1.1 times and about 10 times greater than an elastic modulus of said screen portion.

9. The portable movie screen of claim 1, wherein said at least one side portion has a lip portion, said lip portion configured to overlap at least a portion of a front wall or a back wall of the support body.

10. The portable movie screen of claim 9, wherein said lip portion includes an elastic draw cord.

11. The portable movie screen of claim 1, wherein said at least one side portion includes one or more spandex materials.

12. The portable movie screen of claim 1, further comprising:
    a back portion generally opposite said front portion, said at least one side portion extending between said back portion and said front portion, said receiving space being defined between said front portion, said back portion, and said at least one side portion;
    an opening formed in said at least one side portion, said opening providing access the receiving space, and
    one or more closure elements configured to selectively close said opening and further tension said screen portion.

13. The portable movie screen of claim 12, wherein said one or more closure elements comprise a flap member pivotally attached to said front portion, said flap member being movable between an open position and a closed position in which said flap member extends over said opening and attaches to said back portion.

14. The portable movie screen of claim 12, wherein said one or more closure elements comprise a zipper extending along a portion of said at least one side portion.

15. The portable movie screen of claim 1, further comprising one or more tensioning members connected to said one or more side portions and selectively extendable across an front wall or a back wall of the support body, said one or more tensioning members configured to selectively tighten the cover member over the support body.

16. A portable movie screen system comprising:
    a support body including at least one sealed air chamber and movable between a collapsed configuration and an expanded configuration;
    a cover member positionable on said support body, said cover member comprising:
        a front portion including a screen portion and a frame portion extending at least in part around the periphery of said screen portion, said screen portion having an elasticity that is greater than an elasticity of said frame portion;
        at least one side portion connected to said front portion; and
        a receiving space defined at least in part by said front portion and said at least one side portion, said receiving space configured to selectively receive said support body,
        wherein said frame portion is configured such that when the support body is in the expanded configuration and positioned in said receiving space, said frame portion tensions said screen portion and substantially flattens said screen portion.

17. The system of claim 16, wherein said cover member includes an adjustable draw cord.

18. A method of assembling a portable movie screen system, the method comprising:
    providing a cover member including:
        a front portion including a screen portion and a frame portion extending at least in part around the periphery of said screen portion, said screen portion having a screen gain greater than about 0.8 and an elasticity that is greater than an elasticity of said frame portion;
        at least one side portion connected to said front portion; and
        a receiving space defined at least in part by said front portion and said at least one side portion; and
    inserting a support body within said receiving space of said cover member, said support body being movable between a collapsed configuration and an expanded configuration in which said support body causes said frame portion to tension said screen portion and substantially maintain said screen portion in a desired shape.

19. The method of claim 18, wherein said support body is an air mattress.

20. The method of claim 18, wherein said at least one side portion has an elasticity greater than the elasticity of the frame portion.

\* \* \* \* \*